US012762730B1

(12) United States Patent
Anderson

(10) Patent No.: US 12,762,730 B1
(45) Date of Patent: Oct. 13, 2026

(54) SYSTEM AND METHOD FOR VIDEO ANALYTICS PROCESSING ON DYNAMICAL CONTENT

(71) Applicant: Dimension, Inc., Las Vegas, NV (US)

(72) Inventor: James Anderson, Brooklyn Park, MN (US)

(73) Assignee: Dimension, Inc., Las Vegas, NV (US)

( * ) Notice: Subject to any disclaimer, the term of this patent is extended or adjusted under 35 U.S.C. 154(b) by 0 days.

(21) Appl. No.: 19/444,928

(22) Filed: Jan. 9, 2026

Related U.S. Application Data

(60) Provisional application No. 63/918,219, filed on Nov. 15, 2025.

(51) Int. Cl.
*G06T 7/70* (2017.01)
*G06T 5/70* (2024.01)

(52) U.S. Cl.
CPC .................. *G06T 7/70* (2017.01); *G06T 5/70* (2024.01); *G06T 2207/10016* (2013.01)

(58) Field of Classification Search
CPC .... G06T 7/70; G06T 5/70; G06T 2207/10016
See application file for complete search history.

(56) References Cited

U.S. PATENT DOCUMENTS 11,582,485 B1 * 2/2023 Cherian ................. G06V 10/86

* cited by examiner

*Primary Examiner* — Vincent Rudolph
*Assistant Examiner* — Bradley O Felix
(74) *Attorney, Agent, or Firm* — Chris Tanner; FYPA.legal

(57) ABSTRACT

A multi-frame video analytics (MFVA) system is disclosed, in which contiguous video frame-sequences are processed in reconstruction of 3D dynamical relationships amongst tracked objects. A tensor-based spatiotemporal volume (STV) formalism mapped to buffered successive video-frames is employed. An optical flow field calculation is then applied to this STV for recovery of z-axis information. Standard dynamics in terms of position, velocity, and acceleration are then reconstructed via numerical approximation of time-derivatives on the set of spatiotemporal trajectories (STT) generated by tracked objects that together constitute a bounding STV. In this manner, STVs are rendered causal, with implication application of a suitable knowledge (KBASE) representation also generates an explanatory framework consisting of a set of primitive assertions on tracked objects, now informed by dynamical state, phase flow, and interaction events. This framework is then employed as basis for generation of an enhanced set of video analytics.

11 Claims, 18 Drawing Sheets

FIG. 11 (pre/post processing by embodiments herein)

Replacement Drawing 19/444,928

SYSTEM AND METHOD FOR VIDEO ANALYTICS PROCESSING ON DYNAMICAL CONTENT

BACKGROUND OF THE INVENTION

More than 50% of all big data accrues in form of video. This suggests applicability of Multi Factor Video Analysis (MFVA) within a context of BigData Information Processing (BDIP). Such an application would be advantageous for several reasons. To the extent MFVA-generated dynamics remain pertinent to calculation of a given BDIP conjecture truth-value, it makes sense to consider addition of MFVA functionality to BDIP. This would result in a cutting-edge video and image processing technology which would enable substantive performance improvements and extended capabilities in video processing using Artificial Intelligence (AI) applications.

SUMMARY

In an embodiment, a preferred hardware platform for running the various embodiments disclosed herein might include but is not limited to Nvidia GPU. Again, this platform is referenced for enablement-only, example-only, and should not be considered as limiting.

An example business model for the embodiments herein might be where a large company to buys the embodiments herein and integrate them into their products, where non-limiting examples might include Nvidia, Microsoft, or other Data Center operators.

The MFVA embodiments described herein are suitable for forming a type of video understanding capability which is advancements of existing resources in the data center marketplace. One packaging modality could include packing the embodiments herein directly into GPU chips.

The embodiments of cutting-edge video and image processing technology described herein can enable substantive performance improvements and extended capabilities in Artificial Intelligence (AI) applications.

A first innovation in this regard manifests as an across-the-board reduced error-rate for machine learning (ML) classifiers which are then applied to video. A second innovation is capability for direct video-to-text (V2T) conversion based upon extraction of dynamical state on at least part of all tracked objects appearing within a video sequence.

It is also highly significant that both the reduced ML error rate and V2T innovations discussed herein are directly extensible to BDIP, which can facilitate development of an entirely new generation of business intelligencer applications, but now with exascale-level processing on video content. This capability anticipates emergence of an entirely new 'Big-Data' market sector for which a massive economic potential is expected. Applicant regards this as valuable post NLP, LLM, and generative AI.

The embodiments herein connect the high-performance video and image-processing technology to suitable for substantive participation within an AI marketplace.

DETAILED DESCRIPTION OF THE PREFERRED EMBODIMENTS

Figure 1:
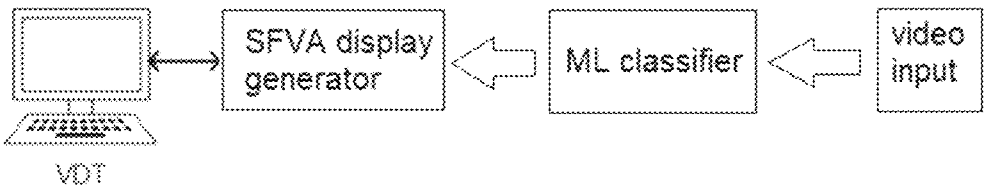
FIG. 1 (Prior Art)
FIG. 1 (Prior Art) shows an example SFVA embodiment.

Before explaining the embodiments, it is helpful to list out the various acronyms that will be used herein. This section is included at the beginning, right at the top, in order to provide a convenient point of reference.

Semantics, Acronyms, and Drawing Conventions

AI/ML Artificial Intelligence/Machine Learning
BDA BigData Assembly (also BD-Assembly)
BDE BigData Exploration
BDIP BigData Information Processing
BDT BigData Transport
BD-CODEX BigData CODEX
CNF Conjunctive Normal Form (logical expression)
DNF Disjunctive Normal Form (logical expression)
DATAVERSE Universal set of all BigData data-elements
CNN Convolutional Neural-Network
EAG Entity-Attribute Graph
FPS Frames-per-Second
HPC High Performance Computation
ISP Internet Service Provider
KBASE AI Knowledge Base
KDR Keywords, Declaratives, Relations
LHS Left-Hand-Side (equation)
LLM Large-Language Model
LLN Law of Large Numbers (statistics)
OFS Optical Flow Signature
OSI Open Systems Intercommunication (model)
MFVA Multi-Frame Video Analytics
ML Machine Learning
MONITOR AI-system executive controller
NLP Natural Language Processing NN Neural-Network
PATTERN AI-system ML/pattern classifier(s)
QoR Quality-of-Result
RDB Relational Data-Base
RHS Right-Hand-Side (equation)
SEARCH AI-system nondeterministic search-engine
SFVA Single-Frame Video Analytics
SQL Structured Query Language
RDBMS Relational Database Management System
SREC Superresolution-Enabled Video CODEC
V2T Direct Video-to-Text
VDT Video Display Terminal
VDY Video Dynamics
WFF Well-Formed Formula Within this disclosure, some of the above may occasionally be spelled out in the prose description, and maybe within the drawings. However, to save space, to increase readability, sometimes the shorter acronyms will be used. This occurs especially in the drawings, where space is limited and where it may be difficult to spell out the full acronym in the vary small amount of space given, and still obey Patent Drawings requirements.

Next, within the embodiments herein, many of the drawings will show a model for video processing, in which conventional video arrives at the RH side of the drawing, undergoes various processing steps or treatments according to the embodiments herein, and is then displayed on a VDT (Video Display Terminal) positioned at the LH side of the drawing. That is just a convention, so that the embodiments herein should not be considered as limited exclusively thereto.

Next, various concepts will be introduced in this disclosure, such as VDY (Video Dynamics). For consistency, only a single designation (e.g. VDY) number will be used for numerous of these concepts, even though many different VDY implementations can be used herein. But this is done for consistency-only, to make the various portions of this disclosure easier to read and have a consistent point of reference. As such, that should not be interpreted that a VDY in FIG. X is the exact same as the VDY in FIG. Y. Instead, explaining these differences every time could detract from the overall meaning and intent of this disclosure.

Begin Description

What is often referred to as video analytics is more accurately described as Single-Frame Video Analytics (SFVA) process which is applied to a succession of (video) frames. SFVA is restricted to processing on dependencies fully defined within context of a single frame. As soon as a new frame must be displayed, any information from the earlier frame is wiped, gone, no legacy remains. Accordingly, SFVA mechanisms suffer from a lot of problems in reducing processing necessary to effectively display video sequences. Meanwhile, the embodiments herein greatly enhance an ability to display video sequences at considerable reduction in processing power.

Since recognition of dynamical information must be rendered via spatiotemporal reconstruction on a multiplicity of frames, SFVA is conventionally understood as fundamentally incapable of processing or even representing dynamical information associated with any object detection. Among other implications, SFVA visual 'tracking' yields only an appearance of continuity of tracked movement.

The embodiments herein equip standard ML-based video analytics applications with a new capability to represent, reconstruct, and process dynamical relationships amongst objects appearing within a contiguous frame sequence. Doing so obtains a comprehensive basis for video understanding that extends well beyond simple video object detection.

FIG. 1 (Prior Art) shows an example SFVA embodiment comprising one or more machine-learning (ML) classifiers generating an output which is rendered as a layered combination of the original video, plus a bounding-box on each object appearing within a single frame, plus a label attached to each bounding box. In modern SFVA, ML classifiers are typically implemented as multilayered neural-networks, of which one form emerges as particularly significant to video applications, sometimes known as a convolutional neural-network (CNN).

ML/NN QoR (Quality of Result) depends upon; (i) derived structure of an assumed feature-space representation plus clustering model and (ii) NN-layering plus neuron-count per layer, (i.e. that together define number of inputs for each neuron). A third consideration is that the error-rate of any ML/NN classifier depends upon input video quality. It is this relation motivating inclusion of a video preconditioning process that will serve to normalize performance across a broad swath of input video quality.

The embodiments herein extend the SFVA concept of FIG. 1 (Prior Art) to include processing of multiple frames in extraction of dynamical information which is then subjected to a higher-level analytical process. This process is known as multi-frame video analytics (MFVA). Unlike SFVA, MFVA employs a SpatioTemporal Representation (STR) schema consisting of discrete coordinate sample points for each detected object. In this representation, successive detections on matched objects are associated in construction of a 2D-projected spatiotemporal trajectory on part of each distinct object. Perspective ambiguity is then resolved with calculation of an Optical Flow Field (OFF) by which z-axis information may be recovered for reconstruction of complete 3D SpatioTemporal Trajectories (STT).

Having this data makes it possible to approximate SpatioTemporal Derivatives (STD) based upon a known frame rate, which in turn enables generation of a complete dynamical state description in terms of position, velocity, and acceleration.

This generating of a complete dynamical state for each detected object then enables extraction of dynamical interactions amongst those objects. It is noteworthy that a complete state description of this form is regarded as causal. Accordingly, an entirely new physics-based video analytics capability is extended to an understanding of those dynamical interactions.

Figure 2A:
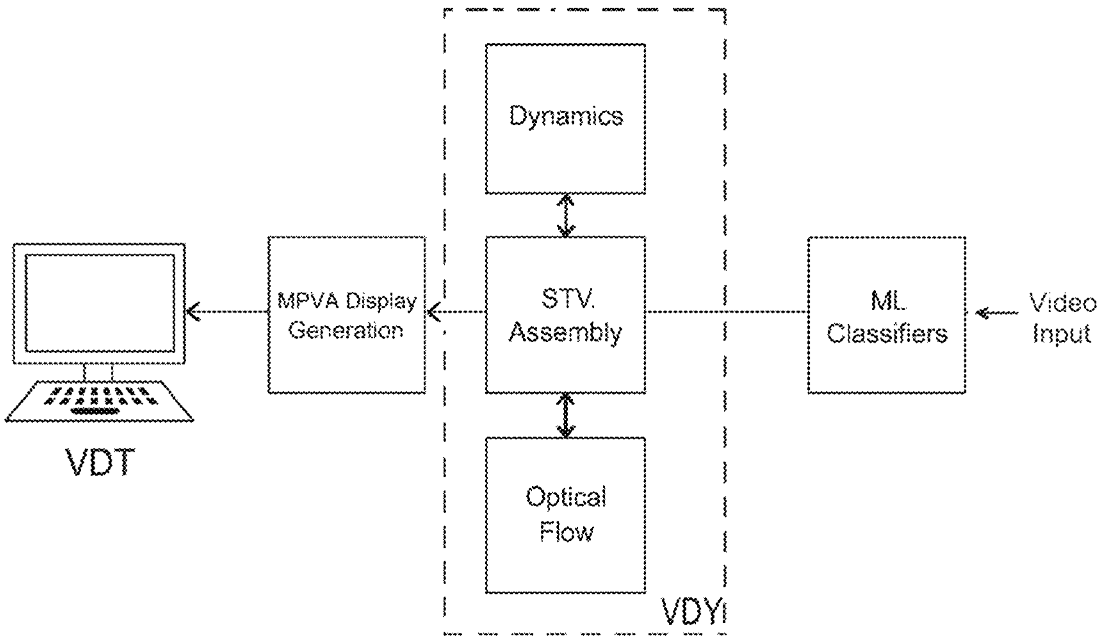
FIG. 2A shows a non-limiting example embodiment of a simplified MFVA architecture.
Figure 2B:
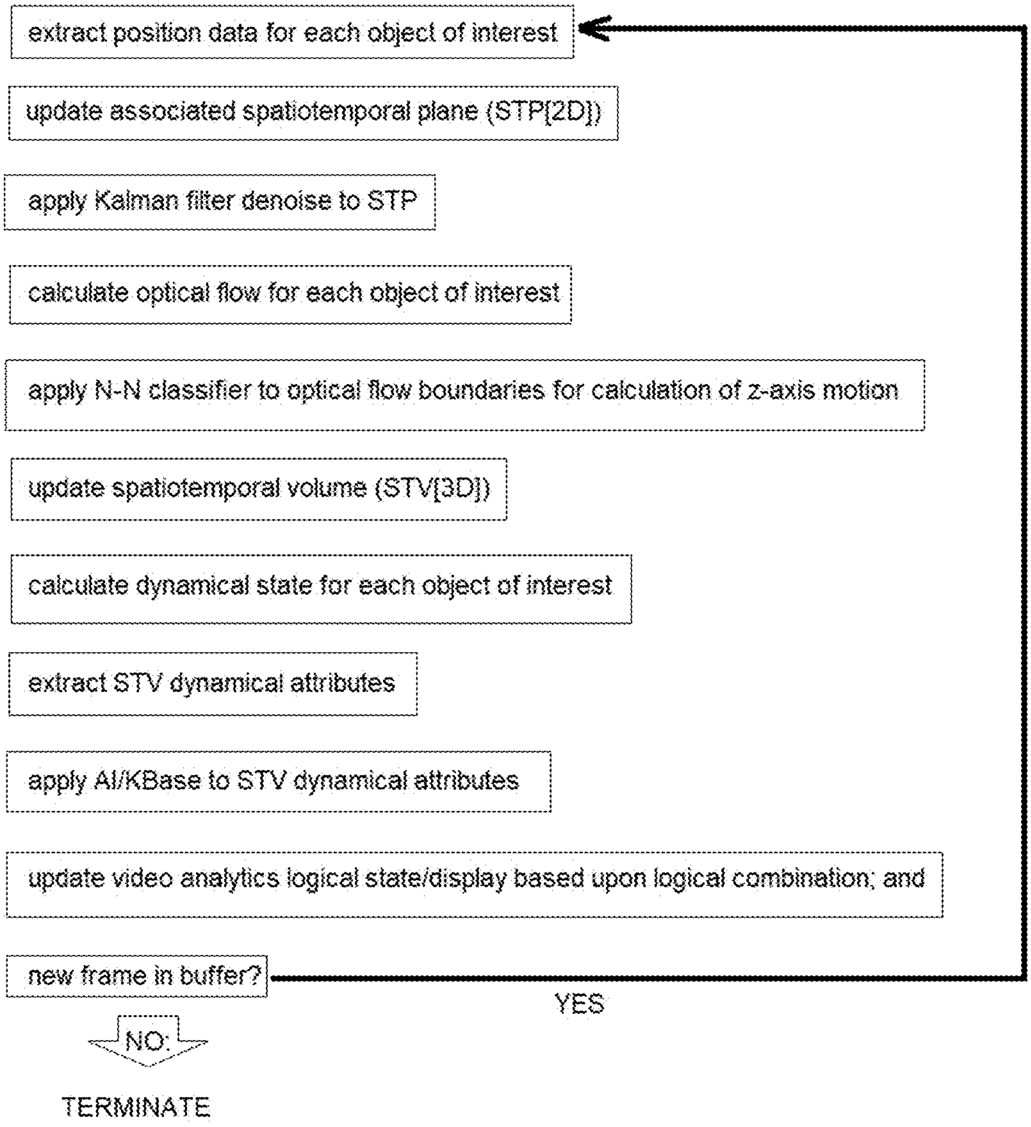
FIG. 2B shows a way of implementing MFVA.

FIG. 2A shows a non-limiting example embodiment of a simplified MFVA architecture functionality, intentionally summarized/abbreviated as a standalone application. The standalone application employs a video analytics use-model where input video is continuously scanned for generation of advisories on some predefined set of object detections. However, FIG. 2A is a simplified, introductory-only version such that the embodiments herein should not be considered as limited thereto. The arrangement of FIG. 2B is merely to begin introducing certain aspects of the embodiments herein. The intentionally-simplified model shown in FIG. 2A provides a simplified MFVA system representation to begin this disclosure.

Within this disclosure, all discussion of MFVA should be understood to include that MFVA may be summarized as an iterative process, repeated for each successive frame. A summary of the below is shown in FIG. 2B:

1. Extract position data for each object of interest;
2. Update associated spatiotemporal plane (STP[2D]);

3. Apply Kalman filter denoise to STP;
4. Calculate an optical flow for each object of interest;
5. Apply an N-N classifier to optical flow boundaries for calculation of z-axis motion;
6. Update a spatiotemporal volume (STV[3D]) and in doing so, transition to a 3D modality;
7. Calculate a dynamical state for each object of interest;
8. Extract an STV dynamical attributes
9. Apply AI/KBase to STV dynamical attributes;
10. Update video analytics logical state/display based upon logical combination of object attributes, dynamical state and pertinent AI-generated advisories;
11. New frame in buffer? NO:TERMINATE YES:GOTO '1' for the new frame.

Figure 3:
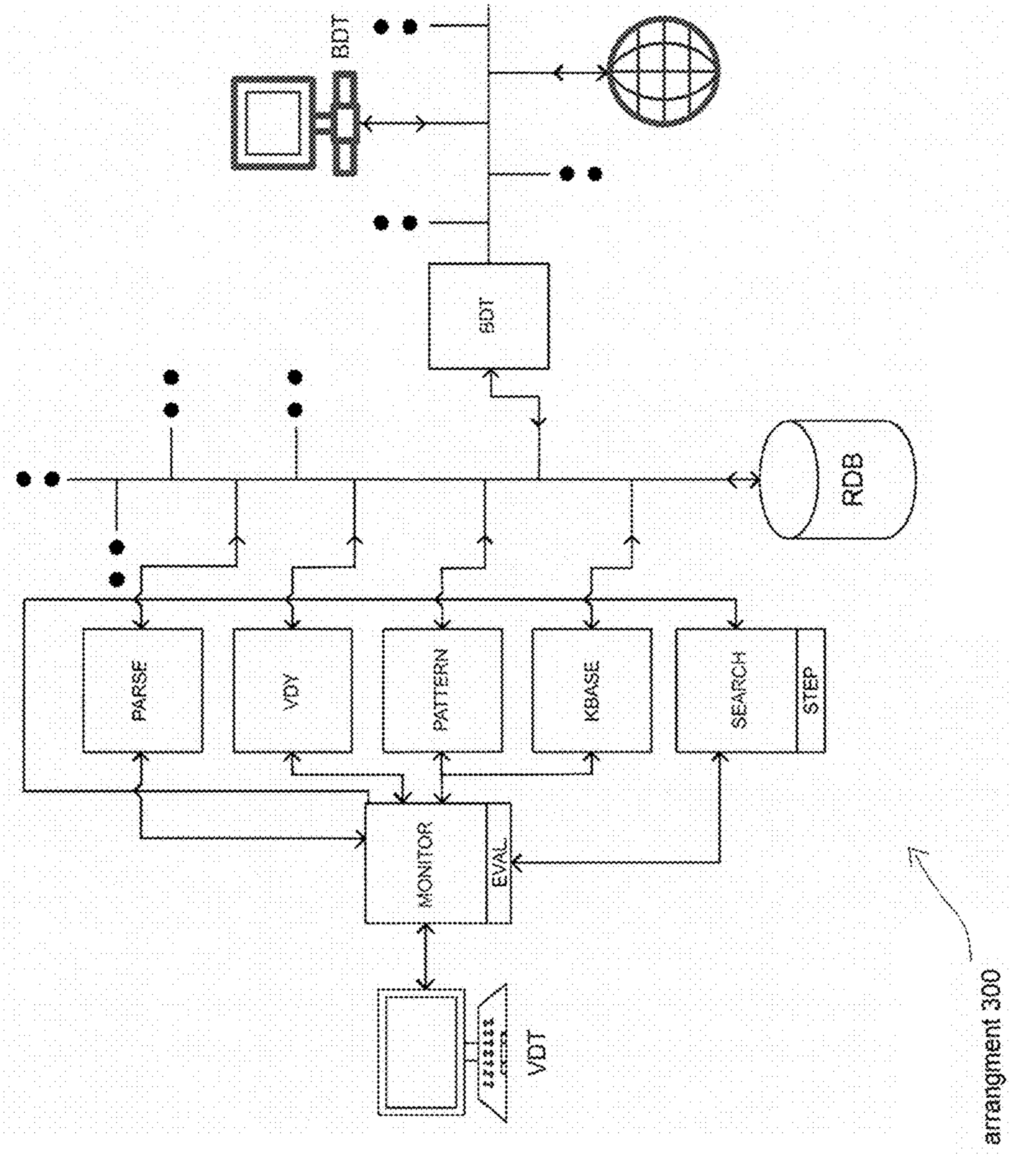
FIG. 3 shows an example arrangement for a BDIP/AI with a MFVA/VDY Front-End.

FIG. 3 shows an example arrangement 300 for a BDIP/AI with a MFVA/VDY Front-End, where the VDY (video dynamics) kernel is leveraged as a generalized front-end connector for BigData information Processing (BDIP) on video content. Amongst other possibilities, the aforementioned MFVA advisories may then be fused with other data-elements in assessing truth values on logical conjectures applied to BigData content.

VDY itself does not require an AI architectural form. Rather, VDY processing is being applied within context of BDIP cast as a problem of goal-directed nondeterministic search on BigData DATAVERSE content, the singular advantage of which is implementation of supervisory control on VDY via the BDIP/MONITOR control envelope. As such, the arrangement of FIG. 3 shows MFVA in a more sophisticated architectural form, to support AI functions found in the BDIP (BigData Information Processing) application. In this way, the MFVA enables a more sophisticated version of the original BDIP system concept. The MFVA thus enables inclusion and subsequent analysis of video data within context of BDIP and in a manner fully consistent with use of NLP (Natural Language Processing) and LLM (Large-Language Model) system components.

I. Spatiotemporal Object Representation

Where video content is considered, data is conveniently represented as a succession of frames consisting of matrices for which pixel values are accessed per standard matrix row/column coordinates. In what follows, it will be convenient to represent all video data in tensor form. Thus, within the embodiments herein, a full-color RGB frame is represented as a rank-2 tensor with covariant indices $$\{y\ (\text{ROW}),\ x\ (\text{COLUMN})\}: \qquad F_{y,x} \equiv F_{ROW,COLUMN} \tag{1}$$

Equation (1) is used to then construct a spatiotemporal volume (STV) via introduction of a single contravariant index corresponding to a buffered succession of frames, resulting in a mixed rank-3 tensor:

$$STV^{k}_{y,x} \equiv STV^{FRAME\ INDEX}_{ROW,COLUMN} = F_{y,x}A^{k} \tag{2}$$

Noting that the frame-indices of equation (2) each correspond to a distinct temporal-index, spatiotemporal trajectories rooted at pixel-coordinate $\{x_0, y_0, t_0\}$ are represented as a dynamical succession of pixel color-vectors appearing at fully specified ROW/COLUMN indices in equation (2):

$$\vec{p}_{y_o x_o;k} \in \{STV^{0}_{y_o x_o}, \ldots, STV^{N-1}_{y_{N-1} x_{N-1}}\} \tag{3}$$

Assuming the 'N' successive pixel vectors in equation (3) provide sufficient computational support at index 'k', dynamical variables are cast as functions on a trajectory extracted from the STV tensor field:

$$\vec{l}(\vec{p}_{y_0 x_0;k}) = \{y_k, x_k, t_k\} \tag{4a}$$

$$\vec{v}(\vec{p}_{y_0 x_0;k}) = \frac{d\left(\vec{l}(\vec{p}_{y_0 x_0;k})\right)}{dt} \tag{4b}$$

$$\vec{a}(\vec{p}_{y_0 x_0;k}) = \frac{d^2\left(\vec{l}(\vec{p}_{y_0 x_0;k})\right)}{dt^2} \tag{4c}$$

In actual calculation, equations (4a-c) will be implemented as numerical approximation formulae. Thus, equations (4a-c) become:

$$\vec{l}(\vec{p}_{y_0 x_0;k}) = \{y_k, x_k, t_k\} \tag{5a}$$

$$\vec{v}(\vec{p}_{y_0 x_0;k}) \doteq \frac{\Delta\left(\vec{l}(\vec{p}_{y_0 x_0;k})\right)}{\Delta t} \tag{5b}$$

$$\vec{a}(\vec{p}_{y_0 x_0;k}) \doteq \frac{\Delta^2\left(\vec{l}(\vec{p}_{y_0 x_0;k})\right)}{\Delta t^2} \tag{5c}$$

It is significant that the video dynamics displayed in equations (4, 5) constitute a 2D projection of what is actually 3D motion. That is, each video frame may be understood as a 2-D projection of a 3-D scene. An essential point of MFVA is that z-axis (3-D) information not normally present in conventional video even with SFVA may be reconstructed via a combination of; (i) projective geometry, (ii) optical flow-field calculation and (iii) spatiotemporal tracking (re: Kalman filter).

As will be shown in at least within in equations (6a-c) below, a complete 3D dynamical model may be calculated via an additional step whereby z-axis information is extracted from analysis of the STV optical flow-field and appended to the base STT representation:

$$\vec{l}(\vec{p}_{y_0 x_0 z_0;k}) \doteq \{y_k, x_k, z_k, t_k\} \tag{6a}$$

$$\vec{v}(\vec{p}_{y_o x_o z_o;k}) \doteq \frac{\Delta\left(\vec{l}(\vec{p}_{y_0 x_0 z_0;k})\right)}{\Delta t} \tag{6b}$$

$$\vec{a}(\vec{p}_{y_0 x_0 z_0;k}) \doteq \frac{\Delta^2\left(\vec{l}(\vec{p}_{y_0 x_0 z_0;k})\right)}{\Delta t^2} \tag{6c}$$

II. Dynamical Reconstruction

As previously discussed, a complete dynamical description for the pixel spatiotemporal trajectory (STT) model in equation (3) requires addition of corresponding z-axis information. It will be assumed this information is obtained via calculation of an optical flow field that specifically includes vectors for those pixels constituting objects being tracked within an STV.

It will further be assumed the aforementioned STTs are each comprised of a single pixel trajectory that may be associated with other STTs per a machine learning (ML)

object detection and bounding process. For example, this single pixel may correspond to an object centroid. However, depending upon the type of dynamical analyses being performed, any subset of pixels constituting an object may be included.

In equation (7) below, optical flow is modeled by a partial differential equation on a pixel-intensity representation for which the pixel color-vector implicit to equations (2, 3) is replaced by color intensity as a scalar quantity:

$$\vec{p} = \vec{p}_R + \vec{p}_G + \vec{p}_B \qquad I = \|\vec{p}\| = \sqrt{\vec{p} \cdot (\vec{p})^t} \tag{7}$$

The linearized optical flow (OF) field is then generated by:

$$\vec{\nabla I} \cdot \vec{v}_{OF} = \vec{\nabla I} \cdot \left( \frac{\partial y_{OF}}{\partial t}, \frac{\partial x_{OF}}{\partial t}, \frac{\partial z_{OF}}{\partial t} \right)^t = -\frac{\partial I}{\partial t} \tag{8}$$

Equation (8) is expressed in terms of two unknowns for which a general solution then requires a second independent equation. Equation (9) normalizes equation (8):

$$\frac{\vec{\nabla I}}{\|\vec{\nabla I}\|} \cdot \left( \frac{\partial y_{OF}}{\partial t}, \frac{\partial x_{OF}}{\partial t}, \frac{\partial z_{OF}}{\partial t} \right)^t = -\frac{\partial I / \partial t}{\|\vec{\nabla I}\|} \tag{9}$$

Rewriting the 'dot' product in equation (9) in an equivalent algebraic form gives:

$$\left\| \frac{\vec{\nabla I}}{\|\vec{\nabla I}\|} \right\| \left\| \left( \frac{\partial y_{OF}}{\partial t}, \frac{\partial x_{OF}}{\partial t}, \frac{\partial z_{OF}}{\partial t} \right)^t \right\| \cos\theta = -\frac{\partial I / \partial t}{\|\vec{\nabla I}\|} \tag{10}$$

Equation (11) rearranges, simplifies, and applies a trigonometric inverse to Equation (10):

$$\theta = \cos^{-1}\left( \frac{\partial I / \partial t}{\|\vec{\nabla I}\| \left\| \left( \frac{\partial y_{OF}}{\partial t}, \frac{\partial x_{OF}}{\partial t}, \frac{\partial z_{OF}}{\partial t} \right) \right\|} \right) \tag{11}$$

From the above equation (11) it can be induced that optical flow must accrue on a vector appearing at a specific angle 'θ' with respect to the normalized intensity gradient. This is a general result. Further, optical flow must itself generate an extremum on the following convex functional:

$$y^* = \min_{p \angle \theta} \left( \vec{\nabla I} \cdot \vec{v}_{OF} + \frac{\partial I}{\partial t} \right)^2 \tag{12}$$

Equation (12) suggests one can assume optical flow is generated by some tracked pixel value occurring in the subsequent frame. Thus, one method solves for optical flow in equation (10) to achieve a three-step discrete optimization in which:

(i) a trial optical flow vector occurring at the indicated angle in equation (11) is selected from the set of all flow vectors generated at tracked-object pixel coordinates;

(ii) the selected vector is substituted in equation (12), and (iii) the result is tested for global optimality. Optimization then terminates at the point where an extremal value is obtained. In what follows, this optical flow is leveraged as basis for z-axis coordinate estimation.

III. Video Analytics on Dynamics

Figure 4:
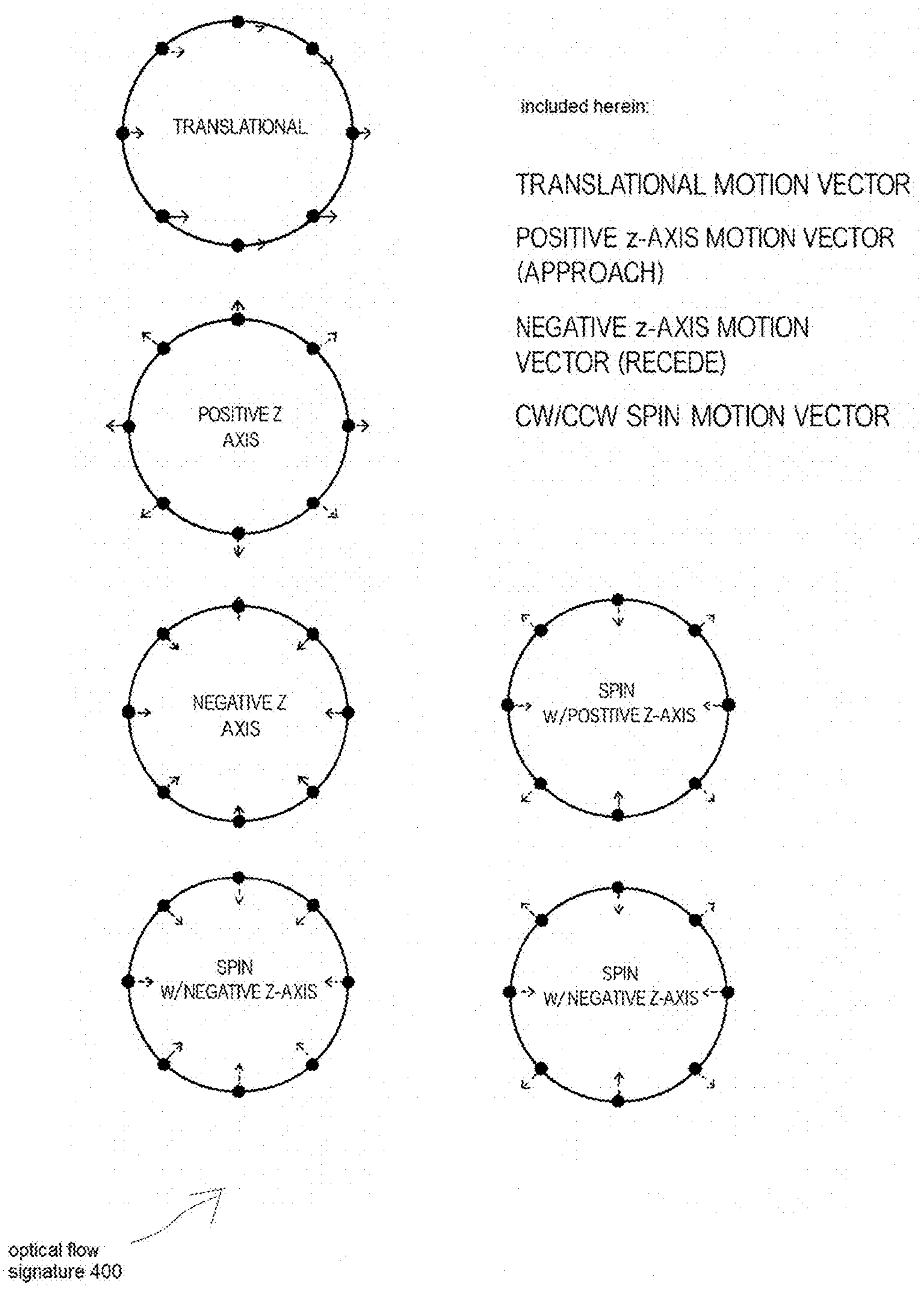
FIG. 4 shows an exemplary Optical Flow Signature (OFS) 400 on a Tracked-Object Periphery.

FIG. 4 shows an exemplary Optical Flow Signature (OFS) 400 on Tracked-Object Periphery illustrating optical flow vectors appearing on the boundary of a tracked object. These optical flow vectors exhibit signatures of various types as the object circumference is traversed. For example, uniformly outward-pointing flow vectors (i.e., away from the object interior) serve as an indicator of z-axis movement toward the perspective viewpoint. Meanwhile, inward-pointing vectors (i.e. toward the object interior), indicate z-axis movement away from the perspective viewpoint.

Similarly, a mixed signature consisting of both inward and outward flow vectors may indicate CW/CCW spin angular rotation about some axis. This optical-flow signature (OFS) serves to inform update or application of any z-axis increment that might be calculated. There are multiple techniques by which a z-axis increment might be estimated.

For example, one can calculate such increments via direct integration of selected $\vec{v}_{OF}$ flow-field components. This may prove a fortuitous choice where a given analytic requires detailed motion analysis on part of a tracked object. However, where dynamics are elementary or a less accurate estimation is acceptable, a more simple approach is to leverage frame-to-frame changes in object area within context of a simple perspective transformation.

It is well known that any object appearing within a 3D visual field is subject to a simple perspective transformation:

$$A_{VIS} = \frac{A_{TRUE}}{r_{VIS}} \tag{13}$$

In this simple model, the geometric area and visual area coincide at a distance 'r=1'. However, equation (13) can be normalized to a given optical system with an object placement at a known distance '$r_{TRUE}$':

$$A_{VIS} = \frac{A_{TRUE} / r_{TRUE}}{r / r_{TRUE}} = \frac{A'_{TRUE}}{r / r_{TRUE}} \tag{14}$$

With regard to MFVA visual dynamics representation, display, and analysis, one non-limiting goal is mutual consistency amongst all objects within the visual field. Accordingly, a desired object z-axis value is given by:

$$\frac{r_{VIS}}{r_{TRUE}} = \frac{A'_{TRUE}}{A_{VIS}} \rightarrow r_{VIS} = \frac{r_{TRUE} A'_{TRUE}}{A_{VIS}} \equiv z_{VIS} \tag{15}$$

Equation-15 is also useful for initialization of STT recursive updates on any tracked object per:

$$\overrightarrow{STT}^{k+1} = \overrightarrow{STT}^{0} + \sum_{i=0}^{k} \vec{v}_{OF} \Delta t \Big| \overrightarrow{STT}^{i} = \overrightarrow{STT}_{VIS} \tag{16a}$$

Such that:

$$\overrightarrow{STT}_{VIS} = (y_{OBJ}, x_{OBJ}, z_{VIS})^t \tag{16b}$$

Over a sequence of frames, equation (16a-b) is leveraged for reconstruction of a dynamical trajectory to which equations (6a-c) may be directly applied:

$$\vec{I}(\vec{p}_{y_o x_o z_o;k}) \equiv \vec{I}(\overrightarrow{STT}_{y_o x_o z_o;k}) \cong \{y_k, x_k, z_k, t_k\} \quad (17a)$$

$$\vec{v}(\vec{p}_{y_o x_o z_o;k}) \equiv \vec{v}(\overrightarrow{STT}_{y_o x_o z_o;k}) \cong \frac{\Delta\left(\overrightarrow{STT}(\vec{p}_{y_o x_o z_o;k})\right)}{\Delta t} \quad (17b)$$

$$\vec{a}(\vec{p}_{y_o x_o z_o;k}) \equiv \vec{a}(\overrightarrow{STT}_{y_o x_o z_o;k}) \cong \frac{\Delta^2\left(\overrightarrow{STT}(\vec{p}_{y_o x_o z_o;k})\right)}{\Delta t^2} \quad (17c)$$

Using the successive updates as applied by Equations 17 (a-c), MFVA dynamical analytics are thus rendered on all tracked objects, frame-by-frame. This is advantageous for achieving more effective video displaying while requiring less processing resources.

A variety of analytics enabled by the MEVA STV-based dynamical reconstruction techniques described herein are highlighted in Table 1.

TABLE 1

Exemplary MFVA Analytics

| $OBJ_K$ | Analytic | Attribute | Note |
|---|---|---|---|
| | BBX[1] | | Object 'Bounding-Box' |
| | DSG[1] | | Designator reference |
| | | CAT | Object category (animate, inanimate) |
| | | MAS | Object mass |
| | | VOL | Object Volume |
| | | DNS | Object Density |
| | POS | | STT coordinate |
| | VEL | | STT velocity |
| | ACC | | STT acceleration |
| | $ITR_{LK}$ | | $OBJ_K$ dynamical interaction w/$OBJ_L$ |
| | $REL_{LK}$ | | $OBJ_K$ in (logical) relation w/$OBJ_L$ |
| | $DYN_{LK}$ | | $OBJ_K$ in (dynamical) relation w/$OBJ_L$ |

[1]Standard VA output

Amongst all objects that might be tracked, two broad categories emerge according to the nominal interactions of these objects. For example, inanimate objects manifesting dynamical interactions are described in terms of stateful energy exchange, (e.g., elastic/inelastic collision w/characteristic energy, momentum, or mass transfer), whereas interactions involving animate objects, although dynamical along an STT, may be dynamical or only logical (i.e., w/no apparent mass-energy transfer).

The distinct nature of $REL_{LK}$ and $DYN_{LK}$ analytics displayed in Table 1 is rooted in a designator which is extracted directly from a given set of MFVA/ML classifier outputs. Most generally, each designator will express an ancillary set of attributes, values of which are either known or remain calculable based upon dynamical state. In what follows, the totality of MFVA analytics are leveraged as means to achieve what is arguably a form of video understanding based upon a set of dynamical relations extracted from a given video sequence. The resulting informational framework may be rendered as descriptive prose, which can be useful because it's easier to apply an LLM to descriptive prose, as will be discussed more herein.

IV. MFVA Architectural Form

Figure 5:
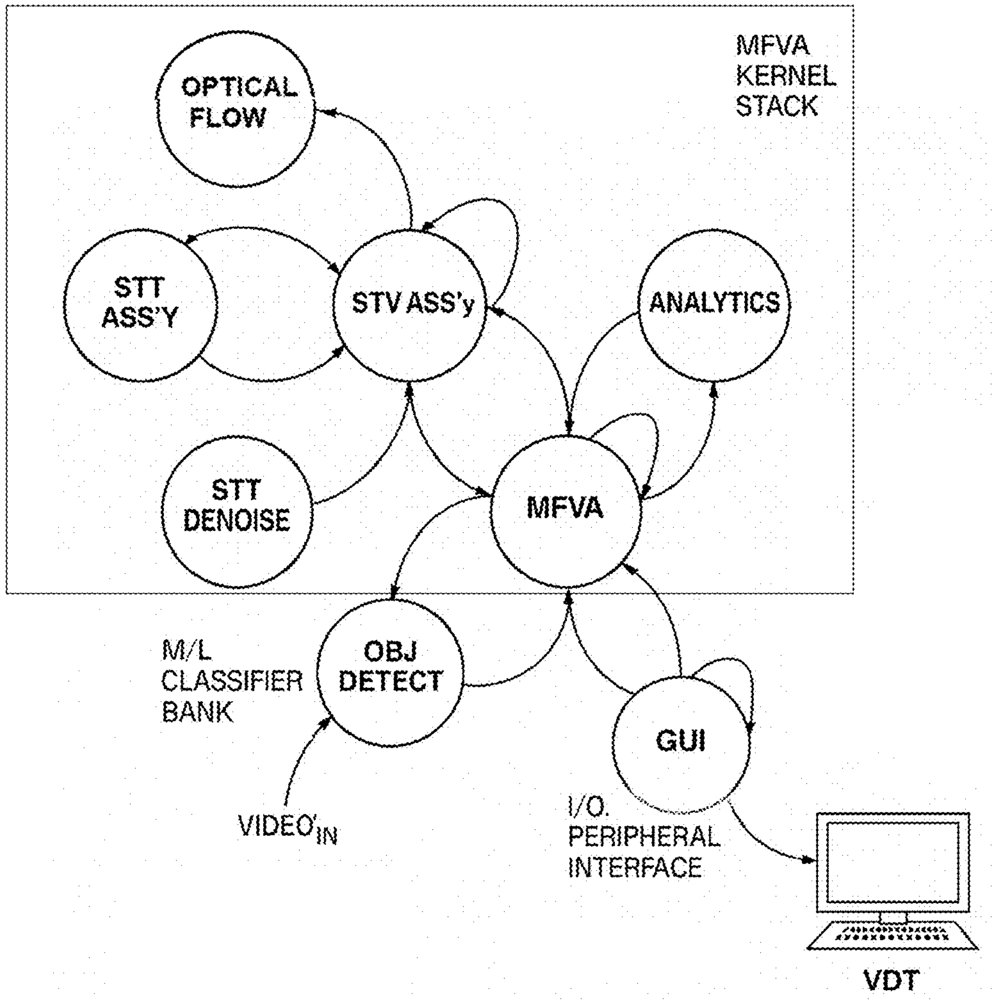
FIG. 5 shows example state transitions of various MFVA embodiments.

Various of the MFVA embodiments described herein will exhibit state transitions as displayed in FIG. 5 above.

TABLE 2

MFVA Process Component descriptions

| Process | Subprocess | Note |
|---|---|---|
| MFVA | | |
| | GUI | Graphical User Interface + Display |
| | Object Detect | M/L Classifiers |
| | Analytics | Analytics processing, display generation |
| | STV Ass'y | Spatiotemporal Volume (STV) assembly |
| | STT Ass'y[1] | Spatiotemporal Trajectory (STT) assembly |
| | STT Denoise | Spatiotemporal Trajectory (STT) denoise using e.g. (Kalman filter) |
| | Optical Flow | Generate optical flow field |

[1]Parallelize for maximum Amdahl gain

Figure 6:
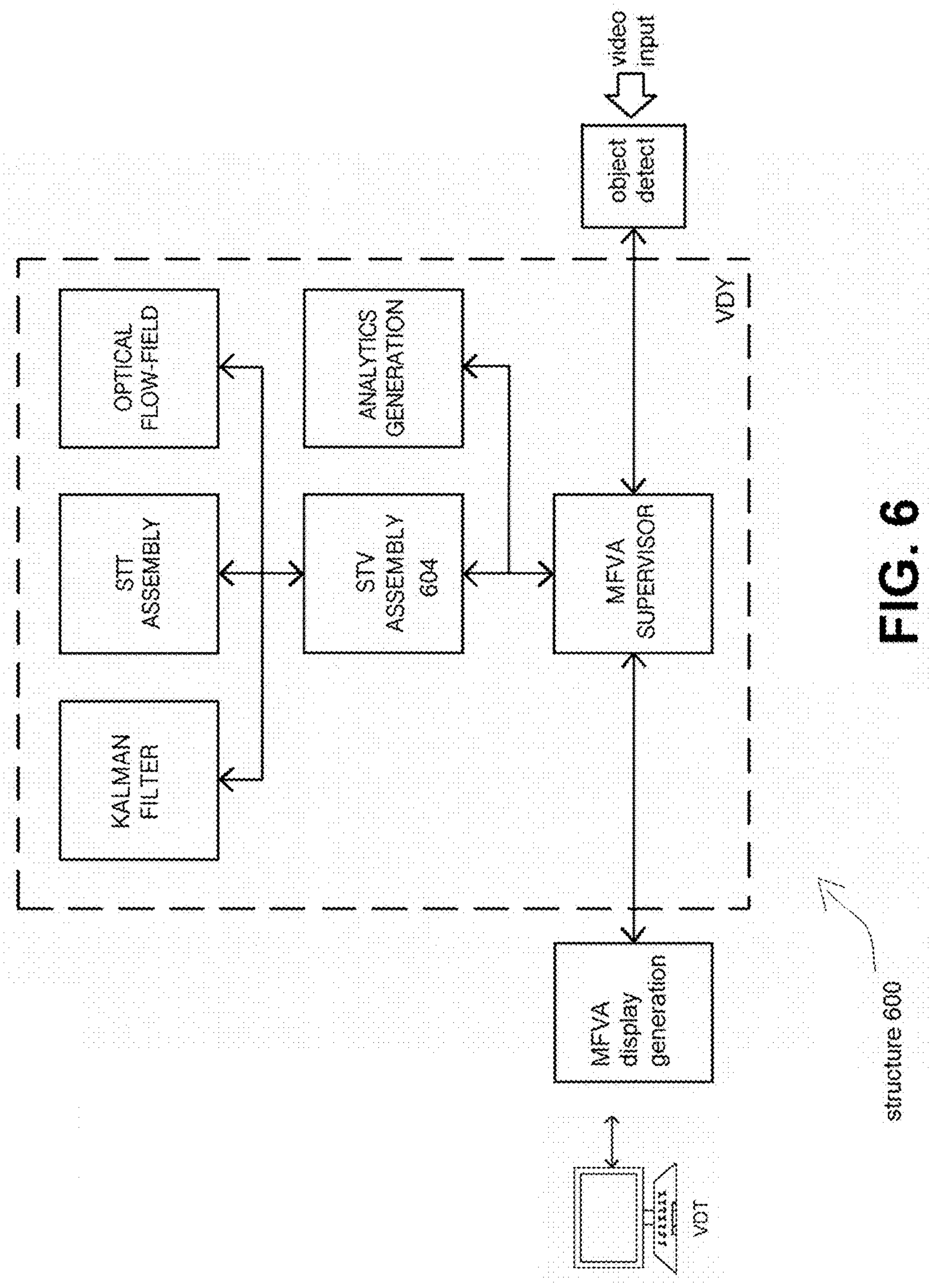
FIG. 6 shows an updated MFVA structure.

Combining FIG. 5 with Table 2, the previous simplified MFVA architecture (re: FIG. 2) now has VDY subprocess components. An example resulting updated MFVA structure 600 is shown in FIG. 6.

One MFVA performance criteria is a number of objects that may be simultaneously tracked. The process/subprocess parallelization provides a significant advantage. The architectural form displayed in FIG. 6 is minimally parallelizable at the level of STV assembly, whereby each tracked object is mapped to a distinct subprocess thread for concurrent STT assembly and denoise. FIG. 6 further shows an STV assembly 605 rendered as a supervisory process on STT assembly. This increased concurrency serves to render an Amdahl throughput-gain for MFVA execution.

V. Enhanced Video Analytics

A single-frame video analytics (SFVA) use model (e.g. FIG. 1) may be a video advisory whereby tracked objects are bounded, labeled, and possibly annotated with known attributes. The MFVA described herein generates a far more enriched advisory model.

The MFVA herein maintains an internal object-dynamics data representation (STV). These dynamics are rooted in Newtonian mechanics and therefore must be regarded as causal. Remember that causal systems are defined by a cause-and-effect relationship where an effect is dependent only on past and present inputs, while acausal systems can be dependent on future inputs as well. Accordingly, the MFVA/STV analytics described herein are fundamentally different from SFVA analytics in that a basis for video interpretation is provided in form of a set of time-series' describing both causal and acausal interrelationships amongst tracked objects.

The MFVA/STV and MFVA analytics described herein make an explanatory framework to which extended analysis may be applied. For example, tracked objects that assume the same coordinates are said to interact, with terms of that interaction depending upon a class membership of the objects. Objects that interact repeatedly or periodically may be described as regularly being specific types of interactions. Such interactions will often exhibit characteristic phase-plane geometries to which a follow-on pattern analysis classification (F-PAC) may be applied.

For brevity and clarity, this disclosure does not specifically address exactly the manner in which neural-network classifiers may be applied to the phase-space representation of the dynamical system being reconstructed. Instead the embodiments herein suggest it is possible to do so. Attributive data for any object that may be combined with other scene attributes is extracted so as to gain an understanding of what specific logical relations may be present. For example, detecting when objects meet, collide, experience energy and momentum transfer, etc. In essence, these classifiers enable detection of movement and interaction patterns that may be exploited as basis for scene understanding.

One use of this information is identification of object subsets forming predominant relationships. Examples include dynamically-bound objects or objects exhibiting a specific logical affinity. However, it is also apparent the aforementioned explanatory framework is not sufficient to extract information beyond the reconstruction already discussed. Rather, an ancillary body of information is required, beginning with FIG. 7 and beyond.

Figure 7:
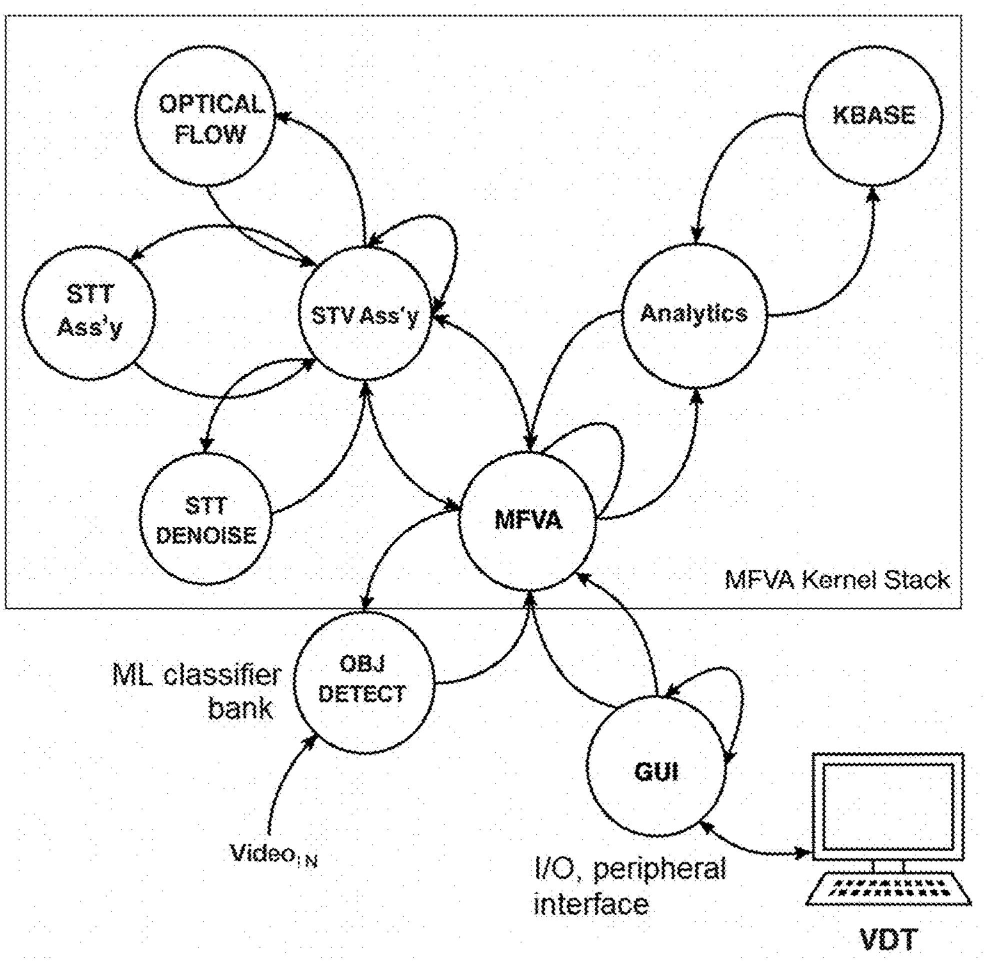
FIG. 7 is a KBASE-Enhanced-MFVA State Transition Diagram.

FIG. 7 is a KBASE-Enhanced-MFVA State Transition Diagram showing one possibility for encoding and processing of such an ancillary body of information, using a production-rule based knowledge representation plus inference-engine (KBASE) which might be found in an artificial intelligence (AI) system.

The MFVA 'problem' has not been cast as one for which the AI goal-directed (nondeterministic) solution search paradigm is deemed appropriate. To address this, the enhanced MFVA state-transition model of FIG. 7 enables direct application of KBASE-with-inference-engine, achieved within a context of video-analytics generation.

Figure 8:
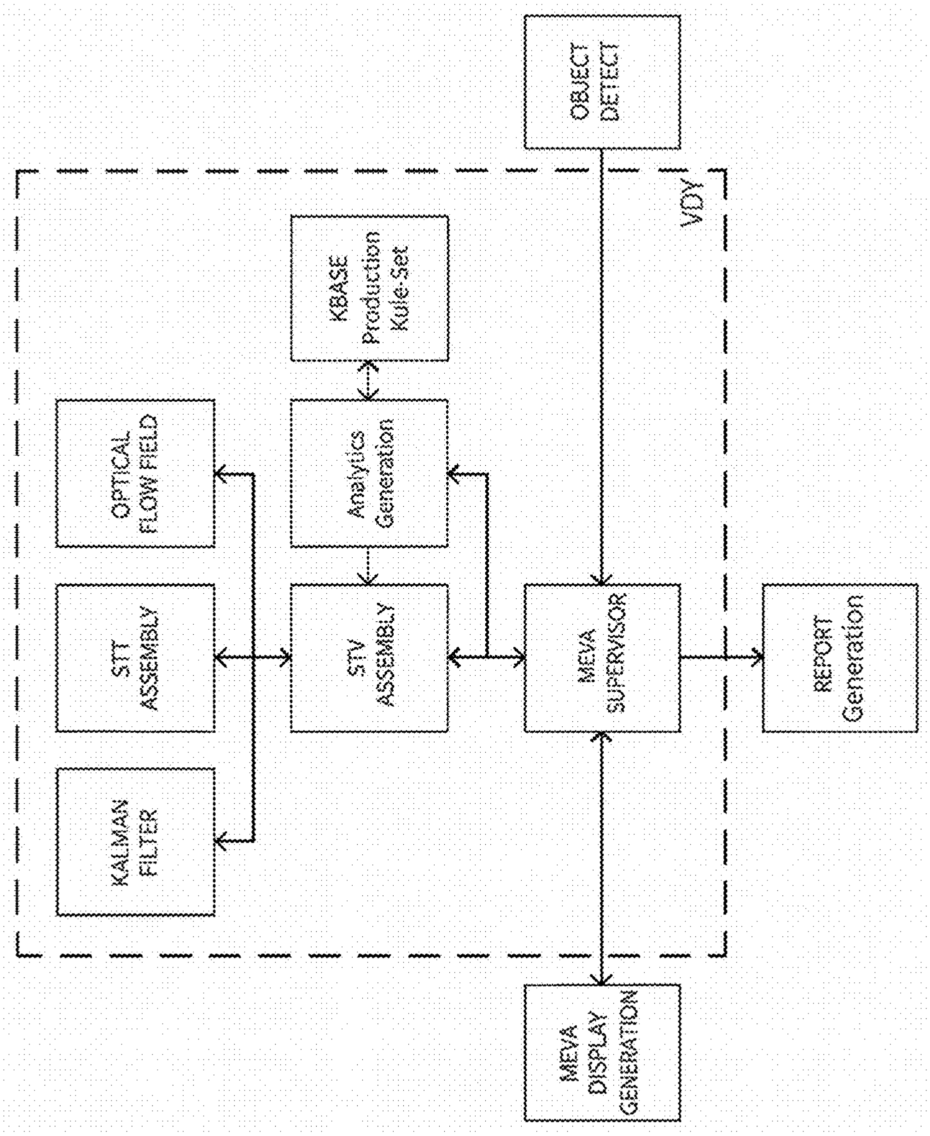
FIG. 8 shows a KBASE-Enhanced MFVA architectural form in which shows an example architecture.

FIG. 8 shows a KBASE-Enhanced MFVA architectural form in which an example architecture provides a basis for implementation of the enhanced MFVA state transition models described herein. In this enhanced architectural form, functional blocks required for STV/STT assembly and updates are isolated to a video dynamics (VDY) subsystem to be made available for reuse as an application building-block:

The REPORT generator within FIG. 8 is significant in that MFVA is enabled to tabulate and list KBASE rule-usages on all video analytics; both nominal object labels plus bounding-boxes, and also those referencing video dynamics on part of tracked objects. A naïve output format would include atomic statements on object attributes such as "$ATTRIBUTE_X$ is assigned to $OBJECT_A$" plus "object-A exhibits $STATE_A$", and now "$OBJECT_A$ has interacted with $OBJECT_B$", plus others generated and assembled as a pertinent set of factoids.

An LLM can then be applied to this output to generate of a prose description constituting video understanding in terms of; (i) objects such and such are present in this sequence, (ii) these objects exhibit properties, attributes, and state, and (iii) object-object interactions have occurred as detected events. The significance is these various outputs together constitute a compound logical statement interpreting and calculating a specific meaning thereby yielding a set of pertinent facts that are meaningfully summarized in prose form.

VI. BDIP/AI Hierarchical Integration

More than 50% of all big data accrues in form of video. This suggests using MFVA with BigData Information Processing (BDIP) would be advantageous. As such, some logical conjecture applied to BD-DATAVERSE can be made. In particular, knowing MFVA-generated dynamics remain pertinent to calculation of a given BDIP conjecture truth-value, then it makes sense to consider addition of MFVA functionality to BDIP.

Figure 9:
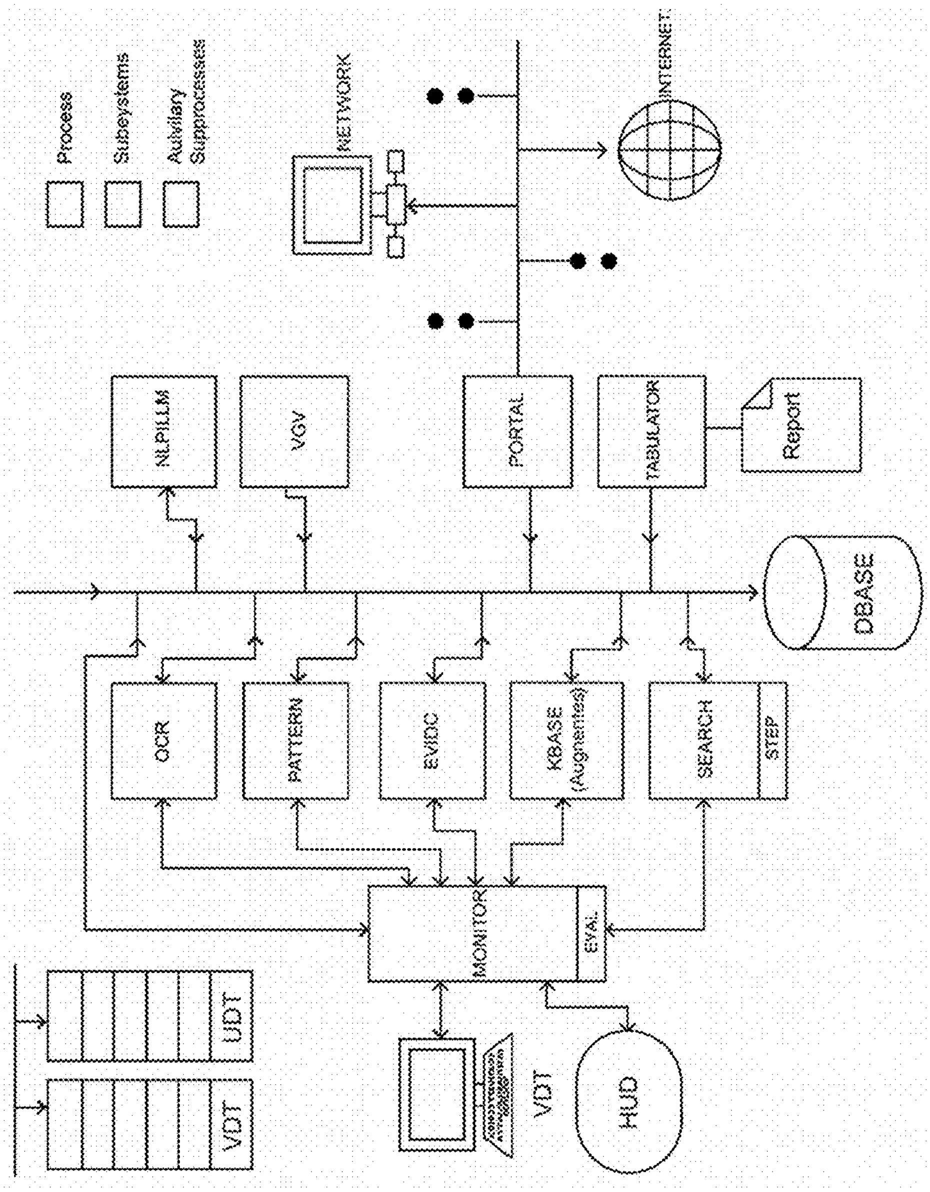
FIG. 9 shows a VDY-Enhanced BDIP Architectural Form with specific MFVA/VDY process components.

FIG. 9 shows a VDY-Enhanced BDIP architectural form with specific MFVA/VDY process components paired with a BDIP architectural form. In this case, all MFVA process components pertinent to a given STT/STV assembly are added to BDIP/AI as subprocesses. The balance of remaining MFVA/KBASE contents are then promoted to BDIP/KBASE for creation of a unified knowledge representation for which derived advantages include:

(i) an enhanced processing efficiency, and (ii) generic applicability of dynamical state to all free-variables appearing within context of BDIP nondeterministic solution-search.

In another significant advantage, the LLM-enabled MFVA video understanding is effectively extended to BDIP exascale processing based upon application of LLM to reduction of all content types to a common textual format.

The VDY-enhanced BDIP architectural form of FIG. 9 is rendered generic to each of BigData Solution (BDSS) component applications per a tailored process-assembly specific to each of BDA, BDE, and BDD tasks. Thus, any one of these functionalities may be invoked and executed based strictly upon KBASE contents. This, combined with an ability to (i) fuse all evidence pertinent to a given logical conjecture within a single processing context and (ii) parallelize any subprocesses accessing KBASE contents, leads to architectural placement of VDY under direct MONITOR control.

Figure 10:
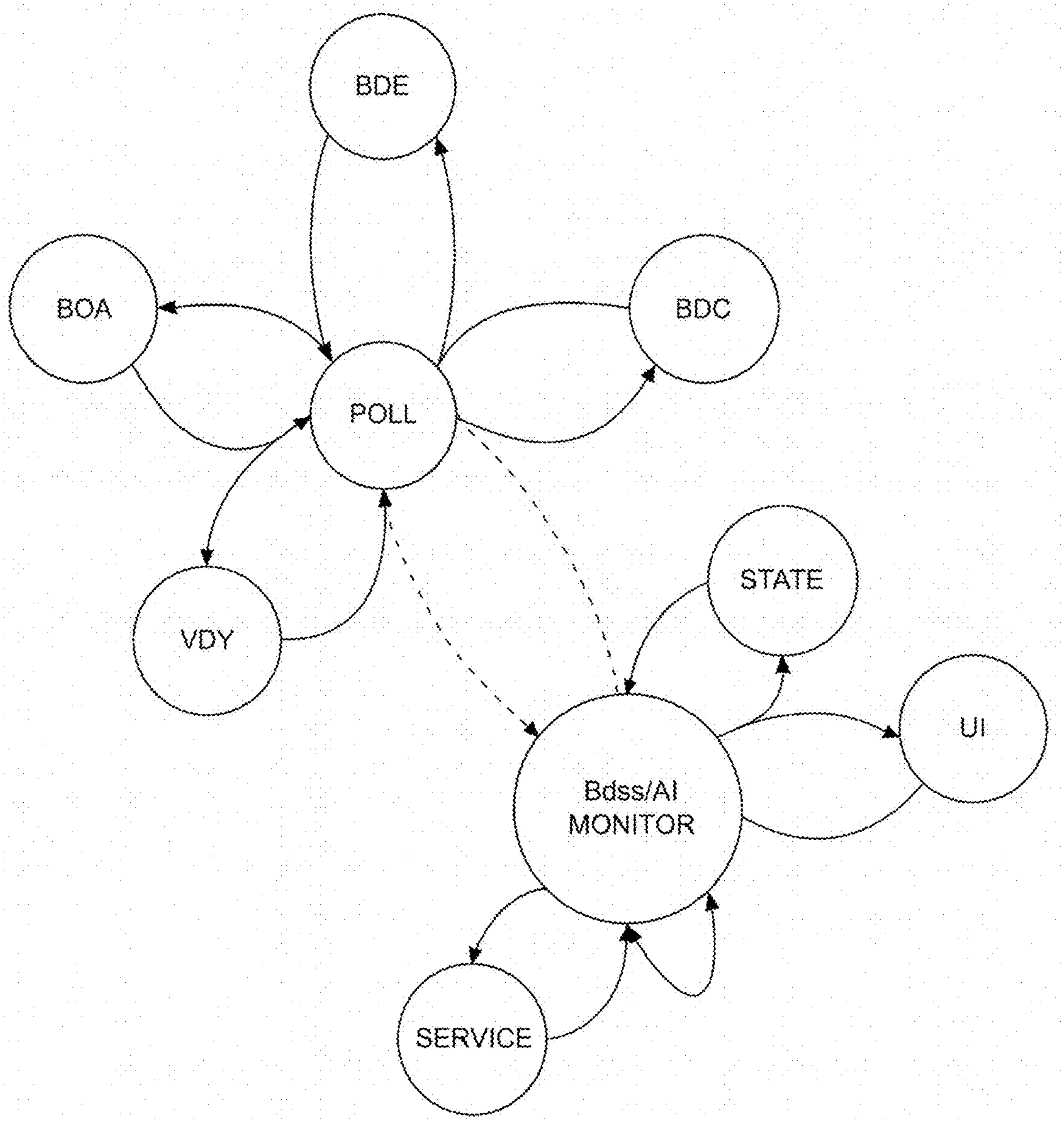
FIG. 10 shows VDY capabilities extended to each of BDA, BDE, and BDD by virtue of STV/STT emplacement on the BDIP/Data Resource Queue displayed in FIG. 9.

This structure is reflected in the VDY-enhanced BDSS state transition model displayed in FIG. 10 which shows a VDY-Enhanced BDIP State Transition Model, with some explanation provided in Table 3.

TABLE 3

VDY-Enhanced BDSS/AI State-Transition Model Detail

| STATE | PROCESS |
|---|---|
| BDA | BigData Assembly |
| BDE | BigData Exploration |
| BDD | BigData Discovery |
| MONITOR | Host/Control Process |
| POLL | Subprocess thread-pool management |
| SERVICE | Package/Enqueue service work-unit |
| STATE | Evaluate BDSS state |
| UI | Generate BDSS/UI display |
| VDY | Video Dynamics Reconstruction |

In FIG. 10 and Table 3, VDY capabilities are extended to each of BDA, BDE, and BDD by virtue of STV/STT emplacement on the BDIP/Data Resource Queue displayed in FIG. 9. Specifically, selected BDIP/KBASE components are applied in calculation of dynamical attributes for any content being processed within context of BDA/BDE/BDD solution-search. The architectural form in FIG. 9 and state transition model in FIG. 10 together form the basis of a complete BigData intelligencer application covering all aspects of exascale evidentiary search on standard text, video, or any content than can be converted to a common textual representation.

Figure 11:
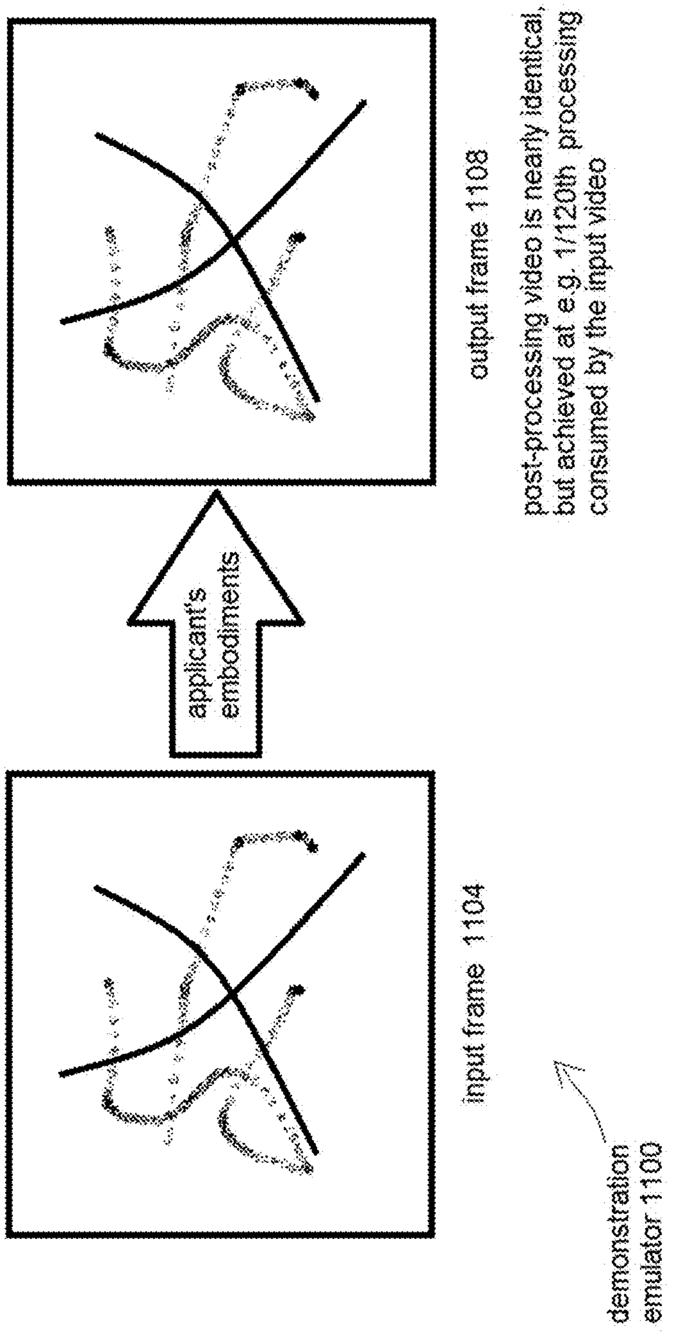
FIG. 11 shows a demonstration emulator 1100 which shows an input frame 1104 and an output frame 1108.

FIG. 11 shows a demonstration emulator 1100 which shows an input frame 1104 and an output frame 1108. The emulator 1100 affirms that the applicant's post-processing (output) frame 1108 is always nearly identical to the input frame 1104. Thus, Applicant's post-processing output video is nearly identical to the input video, but this is achieve using as little as 1/120th the computing/processing that would normally be consumed by the original input video.

Bear in mind that what few differences between the two videos 1104/1108 exist are almost un-noticeable. IOW, the embodiments herein achieve huge processor-savings, valuable anywhere a lot of video is displayed e.g. data-centers.

VII. Concepts to be Protected

MFVA system architectural form with VDY

MFVA system architectural form with VDY and KBASE

- MFVA with STV-tensor as dynamical support
- MFVA video understanding with LLM
- Optical-Flow (OF) based dynamical reconstruction
- Motion Compensated (MC) dynamical reconstruction
- Optical flow field (OFF) calculation via discrete optimization
- OFF signature on tracked object periphery
- OFF-based z-axis reconstruction
- Absolute STT initialization
- Kalman Filter-based MFVA/STV denoise
- MFVA Amdahl gain realization via STV/STT parallelization
- BDIP/VDY video understanding extension to exascale This ends the discussion of various MFVA embodiments. What follows is a discussion of other embodiments also directed to advanced image processing. The following alt-embodiments can be combined with various MFVA techniques already discussed, but may also have stand-alone capability.

ALTERNATE EMBODIMENTS

The embodiments following herein facilitate development of advanced image processing technologies pertinent to technically demanding video applications such as IoT, Surveillance, Analytics, Video Conferencing, VR/AR, and Streaming Video Platforms. In particular, focusing upon image and video reconstruction, denoise, and compression as those processing components most critical to video system performance optimization. Combination of superresolution reconstruction, spatiotemporal denoise, Nyquist refinement, and superresolution-based video compression have together enabled processing gains in the video technology marketplace.

The embodiments herein achieve flexible instancing of technology block-components thereby facilitating development of more complex systems. Fundamental processing blocks are integrated hierarchically in assembly of more complex systems. This has in turn led to design of the aforementioned video applications as integrated products for which a significantly lowered life-cycle cost (LCC) is also indicated.

The embodiments herein provide a hierarchy of building-block resources, ranging from those most fundamental in terms of range of applicability, to those most complex in terms of block integration and functional specialization.

A presentation of complete video applications incorporating the embodiments herein as system components is shown below in Table 4.

TABLE 4

Technology Components

| Component | Basic | Notes |
|---|---|---|
| ASVD | ✓ | Adaptive Spatio-Temporal Video Denoise |
| PMA | ✓ | Pattern Manifold Assembly |
| SREC | | Superresolution Enabled CODEC |
| SREU | | Superresolution Enabled Upscaler |
| SRED | | Superresolution Enabled Downscaler |
| SRNR | | Superresolution Nyquist Refinement |
| SRRS | | Superresolution Video Rescaler |
| VPC | | Video Preconditioner |
| VTT | ✓ | Video to Text |

As described in Table-4, the embodiments herein can be categorized as basic or non-basic with non-basic components hierarchically integrating basic components within some higher level construct:

Hierarchical relationships among technology components displayed in Table-4 are summarized in Table-5 below:

TABLE-5

Technology Component Hierarchical Integration

| Component | ASVD | PMA | SREC | SREU | SRED | SRNR | SRRS | VPC |
|---|---|---|---|---|---|---|---|---|
| SREC | | | | | | | ✓ | |
| SREU | | ✓ | | | | | | |
| SRED | | ✓ | | | | | | |
| SRNR | | ✓ | | | | | | |
| SRRS | | | | ✓ | ✓ | | | ✓ |
| VPC | ✓[1] | | | | | ✓ | | |

[1]Optional

The technology components cited in Tables 4-5 are then flexibly instanced as design building-blocks within a number of applications and productized APIs as shown in Table 6:

TABLE 6

Application/API Instancing of Technology Components

| Component | SREC | SRRS | VTT | Notes |
|---|---|---|---|---|
| BDA1 | ✓ | ✓ | ✓ | BigData Assembly |
| BDE1 | ✓ | ✓ | ✓ | BigData Exploration |
| BDD1 | | ✓ | ✓ | BigData Discovery |
| MFVA | | ✓ | ✓ | Multi-Frame Video Analytics |
| SRAU | | ✓ | | Superresolution Archiver Utility |
| SRRU | | ✓ | | Superresolution Restoration Utility |

[1]BD-IDE Application Component

SUMMARY

A short description is provided for each cited technology component and application.

Adaptive Spatiotemporal Video Denoise (ASVD)

Spatiotemporal formalism is favored in video noise filtering applications due to an inherent encapsulation and averaging of noise sample ensembles, enabling both a direct noise floor reduction and improved estimation accuracy. Recent spatiotemporal estimation concepts have been extended to noise filtering of OCT diagnostic image cubes in which a characteristic multiplicative 'speckle' noise process predominates. MMSE optimal noise transfer is obtained via a multidimensional Weiner filter formulation whereby multiplicative noise is approximated as a non-stationary additive process exhibiting significant noise/signal cross-correlation. In benchmark tests, the Spatiotemporal Video Denoise (SVD) filter structure exhibits an effective noise attenuation with minimal loss of image sharpness or detail. This result can be extended to generic content in which both additive and multiplicative noise sources are present.

Focusing on a noise sampling component, calculation of a given filter transfer function hinges upon accuracy of component PSD estimator terms. A reduced filter performance may be expected where PSD estimators do not accurately reflect actual noise process statistics. In particular, noise samples must not be corrupted by residual signal information in generation of statistical bias. This requirement forms the basic selection criterion for a candidate noise sample space; to the extent PSD estimators exhibit bias, a suboptimal noise transfer may accrue.

As originally conceived, SVD noise estimation hinges upon prespecification of contiguous image sample regions, noise-like and persistent over successive frames. However, despite achieving an effective filter realization, sample regions meeting these requirements are not generally available for all content of interest. Further, the prescan and analysis steps implicit to prespecification are sequential/blocking on an ASVD process schedule and thus incompatible with Amdahl acceleration. These problems are addressed by per-pixel noise sample ensembles being extracted directly from spatiotemporal estimation buffers. In this manner, image sample regions are adaptively rendered as complete frames obviating any requirement for special content structure. This fully adaptive SVD (ASVD) is thus rendered as a parallelizable streaming process on arbitrary signal-plus-noise mixtures.

Figure 12:
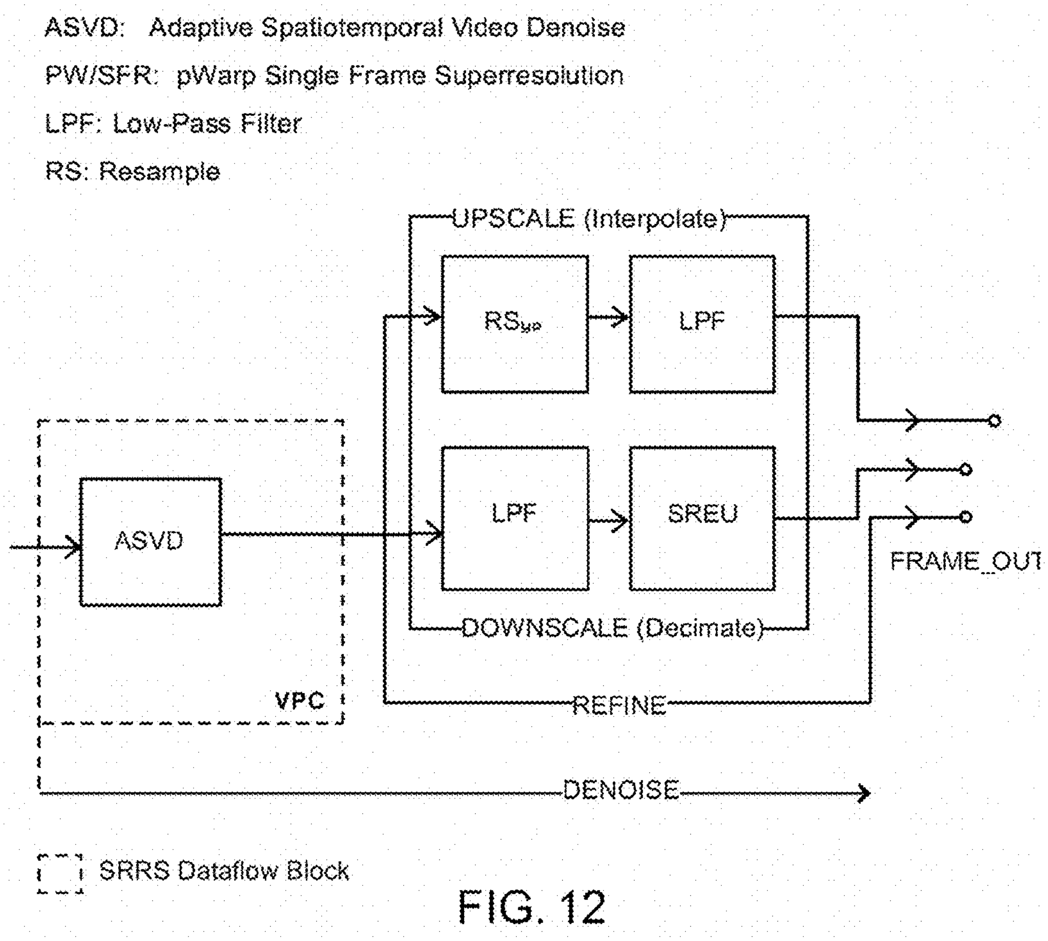
FIG. 12 shows an example SRRS Architectural Form Incorporating VPC/ASVD in which ASVD is optionally incorporated as a hierarchical building-block component within VPC.

FIG. 12 shows an example SRRS Architectural Form Incorporating VPC/ASVD in which ASVD is optionally incorporated as a hierarchical building-block component within VPC, whereby VPC is itself a hierarchical component of SRRS.

Pattern Manifold Assembly (PMA)

Photometric Warp (PWRP) superresolution is defined as an image processing technique in which luminance of any image pixel is rendered dependent upon an auxiliary function of some form. Accordingly, PWRP superresolution is obtained where the referenced auxiliary function is also a reconstruction operator. Further, where the reconstruction operator domain is a single frame, the resulting superresolution construct is referred to as single-frame superresolution (SFSR).

Figure 13:
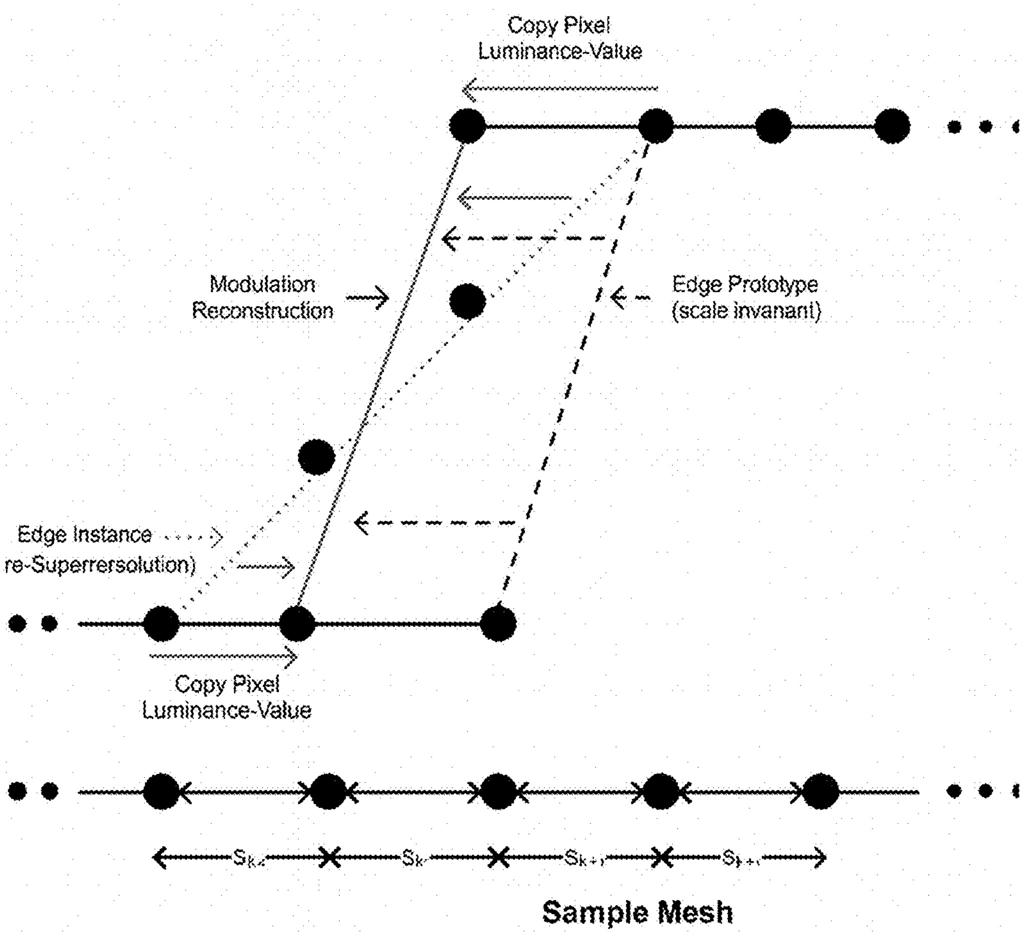
FIG. 13 shows an exemplary Photometric Warp Edge Reconstruction in which the particular PWRP/SFSR used in this work employs an edge-luminance model.

FIG. 13 shows an exemplary Photometric Warp Edge Reconstruction in which the particular PWRP/SFSR employs an edge-luminance model both symmetric and scale invariant. In this instance, model symmetry is motivated by an assumed symmetry associated with the fundamental edge-blurring process. Scale-invariance is then assured via a minimal pixel support to which a set of gradient operators are applied for sub-pixel accurate edge-structure detection. In essence, luminance of a detected edge is modified so as to exactly match the luminance model.

As an example, support for the edge prototype displayed in FIG. 13 is reduced from 4-pixels pre-Warp to 2-pixels post-Warp in generation of a 300% increased slope (sharpness) post-superresolution. In what follows, PWRP/SFSR extends this edge-reconstruction model to arbitrary curvilinear structures via directional correlation along edge-detection contours.

As described, PWRP critically depends upon localization of curvilinear edge structures at subpixel resolution. A tailored nonlinear filter provides this localization at response surface extrema. Once the locus and orientation of an edge-structure at all constituent points is determined, a set of reconstruction filters is instanced at all associated image-space coordinates. The logical sum of all such instances then constitute pattern manifold assembly (PMA) as a necessary component of PWRP/SFSR and hence is also functionally implicit to each of SREU, SRED, and SRNR processing blocks.

In Table-5 above, PMA accrues as a building-block component of SRED, SREU, and SRNR blocks, in turn instanced as hierarchical building-block components of SRRS (re: FIG. 13).

SREU/SRED/SRNR

Each of the superresolution blocks SREU (upscaler), SRED (downscaler), and SRNR (Nyquist refinement) employ photometric warp (PWRP) for purposes of sub-pixel localization of points along curvilinear (1D/line-like) structures appearing within a frame. Resampling and anti-alias filtering are then added so as to render any indicated rescaling process formally valid (re: SRRS).

Note SRNR as something of an exception in that sampling rate remains invariant. Thus, the associated Nyquist limit remains the same and no resampling is performed, (i.e., with no attendant requirement for anti-alias filtering). The sole purpose of SRNR is image refinement via what is essentially a sharpening process that renders a given frame at maximum resolution, subject to bandwidth limits imposed by Nyquist sampling theory. The major advantage of this particular sharpening process is avoiding noise preemphasis as might result from use of a linear high-pass filter (HPF). Furthermore, inasmuch as each of SREU, SRED, and SRNR are themselves linear, there is no noise upconversion as might result from application of a nonlinear filter of one form or another.

For highest possible processing efficiency, SREU, SRED, and SRNR are encapsulated within the SRRS construct. As displayed in Tables 5-6, SRRS is instanced as a component block in SREC, BDA, BDE, BDD, MFVA, SRAU, and SRRU. Note that not all SRRS internal processing pathways are required in each case. Accordingly, for conservation of processing resources, unused SRRS pathways are eliminated via conditional compilation according to an associated design specification. In this manner, any one of SRRS/SREU, SRRS/SRED, or SRRS/SRNR may be isolated and customized according to need. For example, consider SRRS as a block-component of the superresolution enabled video CODEC (SREC) construct displayed in FIG. 14, the optional ASVD is deleted for both ENCODE and DECODE, SREU is deleted for ENCODE, and SRED is deleted for DECODE.

SREC

A number of lossy video CODECs such as MPEG-4 have found widespread acceptance as a video compression technology solution in a 2026 marketplace. In principle, a maximum 200:1 compression ratio is possible with this CODEC. However, the fact MPEG-4 employs a lossy, block-based differential encoding scheme limits useful compression to a more moderate 20:1-40:1 range. Unfortunately, only so much redundancy is present in any given image sequence. One consequence of this is overly aggressive redundancy-based encoding tends to create excessive artifacts and noise in an output image.

While block-based differential video compression has proven very successful, the inherent performance limitations of this approach also serves to hinder evolution of streaming video and video surveillance system applications for which an increased level of compression performance is critical. In the superresolution-enabled video codec (SREC) considered herein, photometric warp (PWRP) superresolution is applied to realization of an increased total compression ratio capability. Use of PWRP in this context is motivated by the fact reconstruction filtering of the type being considered is super-Nyquist. In upscaling of a given image, reconstruction filtering necessarily synthesizes spectral content at frequencies above an initial Nyquist limit characteristic of a lower resolution. Thus, the internal representation that governs instancing of reconstruction filters may be leveraged as a codebook for an optimal encoding of corresponding structure in the target image.

With use of such an encoding, processing gain realization hinges upon two criteria;

(i) the encoded edge-contour structure representation remains more compact than the corresponding spectral representation and (ii) object and edge-contour spectra remain separable at a given Nyquist rate boundary.

In the specific case of photometric warp, these criteria are satisfied via;

(i) an implicit 2D-to-1D dimensional reduction rooted in processing of curvilinear edge-contours bordering objects, (i.e. as opposed to objects), and (ii) partitioning of edge-contour spectra are resolved to an extent consistent with accurate edge-contour reconstruction. Accordingly, video transmission payload is reduced to a sum consisting of; (i) edge-contour encoding plus (ii) source downsampled to the defined super-Nyquist boundary. Noting the downsampled source may itself be encoded by some CODEC operating on an orthogonal compression principle, (i.e. encode distinct structure) total compression is then given by a product of compression ratios generated via what amounts to a two-stage succession of CODEC transformations.

In what follows, this seminal idea forms the basis of a Superresolution-Enabled [video] CODEC (SREC) that employs a lossy, differential/block encoded CODEC such as MPEG-4 as a second layer. In a comprehensive series of experimental trials, this construct is then shown capable of an '×4', '×16' increased compression ratio capability relative to MPEG-4 alone. For example, if stage 1,2 compression ratios are 4:1 and 30:1 respectively, the total compression is 4×30:1=120:1, adjusted downward so as to account for stage-1 reconstruction filter bank instance ENCODE.

It is noteworthy, a variety of SREC architectural forms are possible, depending upon specific blocks chosen for layer-1,2 processing. However, the source-encoded form displayed in FIG. 16 serves to illustrate the basic operational principle. In streaming transport mode, as a single-frame superresolution (SFSR) process, SREC accepts and processes video frame-by-frame, according to the following ENCODE-transport-DECODE schema:

ENCODE (1) Pattern Manifold Assembly (PMA)

(2) ENCODE PWRP reconstruction filter bank instances (layer-1)

(3) DOWNSAMPLE frame (4) ENCODE downsampled frame (layer-2)

(5) INTERLEAVE PWRP/Downsampled frame data (6) TRANSPORT Interleaved data stream (TX)

DECODE (1) TRANSPORT interleaved data stream (RX)

(2) DEINTERLEAVE PWRP/Downsampled frame-data (3) DECODE downsampled frame (layer-2)

(4) UPSAMPLE frame (5) DECODE PWRP reconstruction filter bank instances (layer-1)

(6) RECONSTRUCT frame at original resolution

As might be expected, DECODE forms an inverted processing sequence relative to ENCODE. It is also significant, given PMA sub-pixel resolution, DECODE reconstruction filters are applied at the exact image coordinates at which filter instance ENCODE was performed. In this manner, edge dislocation noise in the reconstructed image is effectively reduced to zero.

Figure 14:
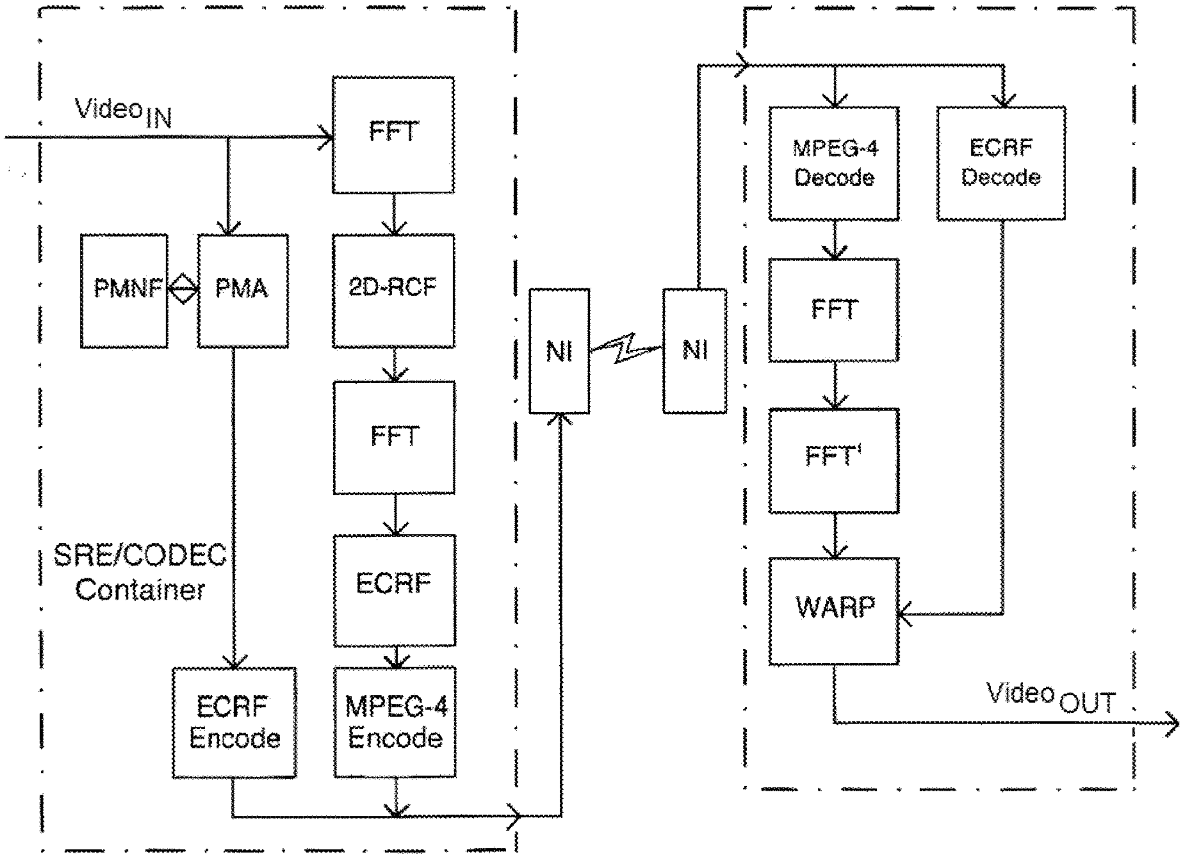
FIG. 14 shows an example SREC ENCODE/DECODE Block Architecture.
Figure 15:
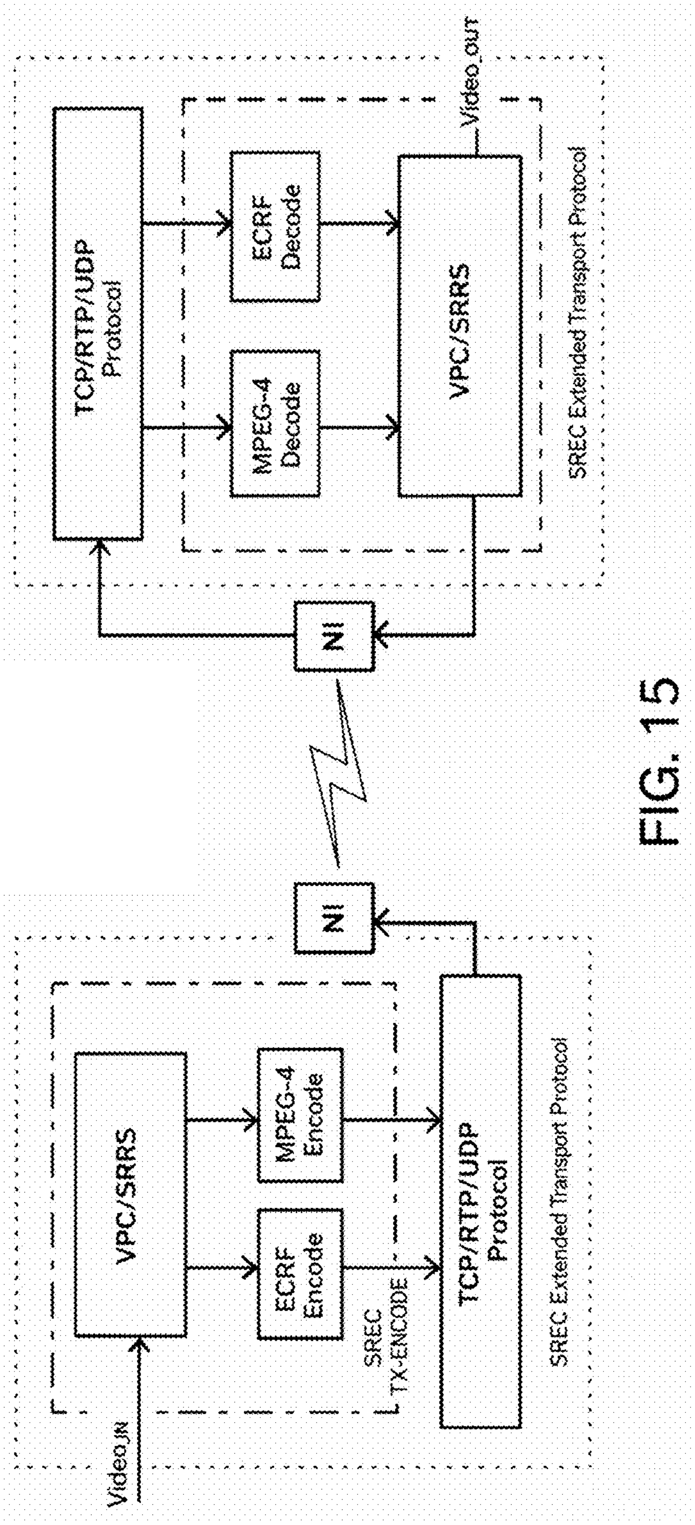
FIG. 15 shows a second SREC realization, in which selected constituent blocks are replaced with SRRS instances.

FIG. 14 shows an example SREC ENCODE/DECODE Block Architecture. FIG. 15 shows a second SREC realization, in which selected constituent blocks of FIG. 14 are replaced with SRRS instances. The result is a VPC/SRRS-based SREC Architectural Form.

Video Analytics (e.g. Including but not Limited to MFVA)

The embodiments herein strive to achieve development of advanced image processing technologies pertinent to high-performance video applications such as IoT, Surveillance, Analytics, Video Conferencing, VR/AR, and Streaming Video Platforms. In particular, this disclosure focuses on image and video reconstruction, denoise, and compression (AKA CODEC) as those processing components most critical to video system performance optimization. Combination of superresolution reconstruction, spatiotemporal denoise, Nyquist refinement, and superresolution-based video compression enable video processing gain at levels heretofore unavailable in the video technology marketplace.

Figure 16:
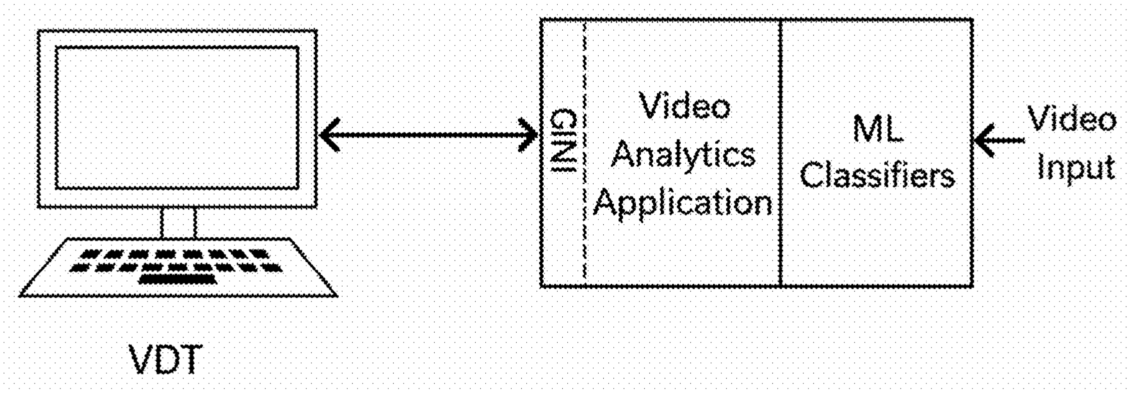
FIG. 16 shows a source-encoded architectural form.

FIG. 16 shows an exemplary video analytics system. The embodiments herein, including that shown within FIG. 16, may prove beneficial in the video analytics ('VA') domain wherein source video is applied to a bank of machine learning ('ML') classifiers that serve to detect and report objects appearing within a video sequence. An error rate of any machine learning classifier one might employ for purposes of video analytics is highly dependent upon input video resolution and signal-to-noise ratio ('SNR'). A video preconditioning ('VPC') subsystem is cited in Tables-4,5 above and discussed within context of superresolution-enabled rescaling (SRRS).

It is significant that VPC incorporates two image/video processing blocks critical to video QoR optimization; (i) adaptive spatiotemporal denoise (ASVD) and (ii) superresolution-enabled Nyquist refinement (SRNR). VPC is advantageous in superresolution-enabled video CODEC (SREC). Analytics (VA), and BigData (BD) processing. Combining those previously mentioned image processing blocks in creation of a video preconditioning pipeline technology that serves to optimize performance of neural-network (NN) based machine learning classifiers we employ in VA and BD applications. More precisely, VPC generates a composite processing gain that minimizes classifier error rates across a broad swath of input video quality. For example, use of VPC as a VA front-end can be expected to improve overall quality-of-result (QoR). It should be noted where input video is noisy or exhibits reduced bandwidth, this improvement can be dramatic.

BigData-IDE

VPC might be applied within context of any ML-based information processing on video content. While the term BigData is currently prominent, a formal definition of the term does not exist, except that it is generally agreed that more than 50% of BigData is video.

BDA/BDE/BDD

The embodiments herein resolve the problem of BigData processing into three component tasks; (i) assembly, (ii) exploration, and (iii) discovery. In simplest terms, BigData Assembly (BDA) is the rendering of an unstructured DATAVERSE into an efficiently searchable form. This task is comprised of an essentially autonomous process of building an entity-attribute graph (EAG) representation to which existing and readily available graph-search techniques may be applied. BigData Exploration (BDE) is then extraction of statistics on keywords, declaratives, and relations (KDR) pertinent to truth-value of some logical-conjecture-on-data (LCOD) posed within context of the analytics. BigData Discovery (BDD) is then the identification of new KDR elements, with subsequent reapplication of BDA, BDE, and possible restatement of any LCOD we apply within context of BDE. In effect, BDD will initiate invocation of BDA and BDE as subprocesses within context of an overarching problem of evaluating LCOD truth-values. The BDA, BDE, and BDD together form a complete processing infrastructure for development of video analytics platforms on for a BigData DATAVERSE.

Figure 17:
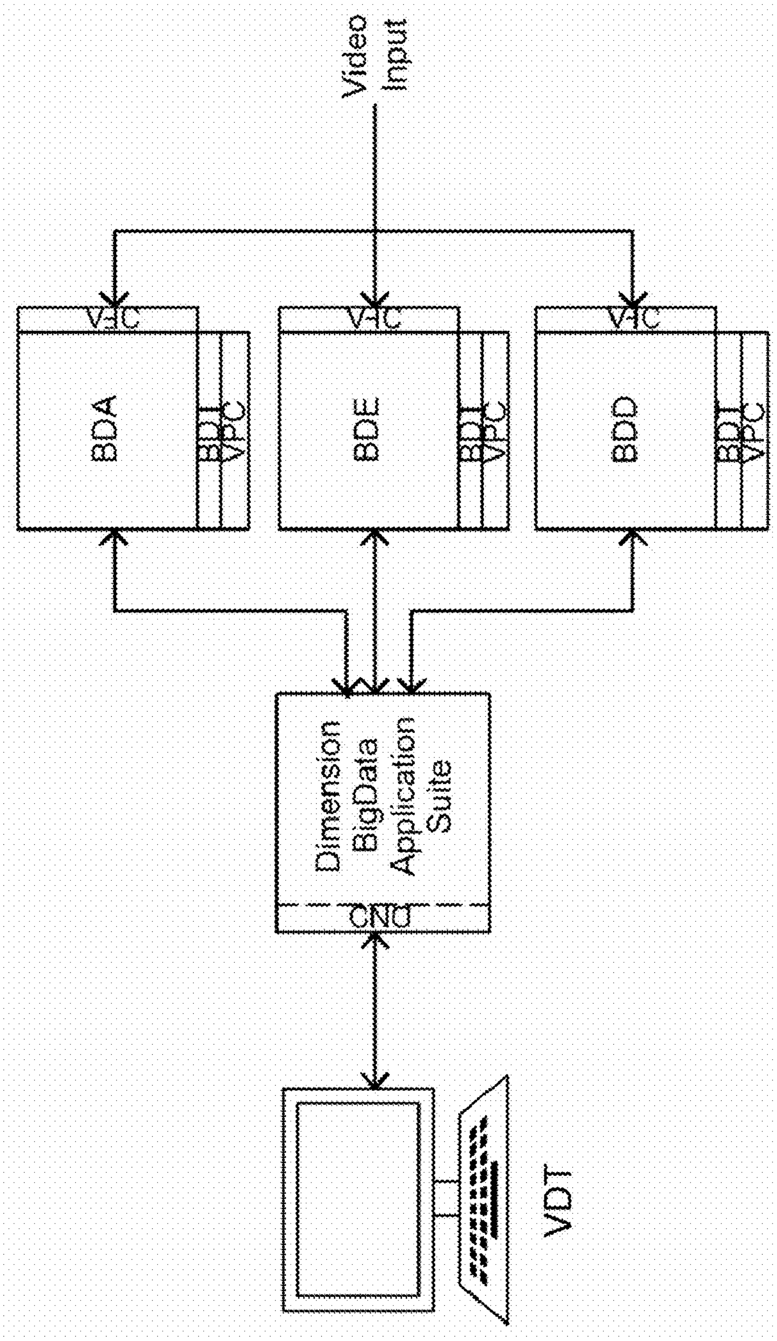
FIG. 17 shows a proposed integrated processing environment for BigData.

Accordingly, an integrated processing environment for BigData is proposed in FIG. 17 which shows a BigData Application Suite where each component of which will employ VPC technology. The embodiments herein provide not only new video analytics technology but also contribute to an entirely new BigData market sector.

It is also true each of the aforementioned BDA, BDE, and BDD applications incur significant nondeterminism. That is to say, these tasks are appropriately cast in terms of goal-directed, nondeterministic solution-search characteristic of artificial intelligence (AI) applications. Accordingly, AI architectural forms are indicated for each of these component processes.

Figure 18:
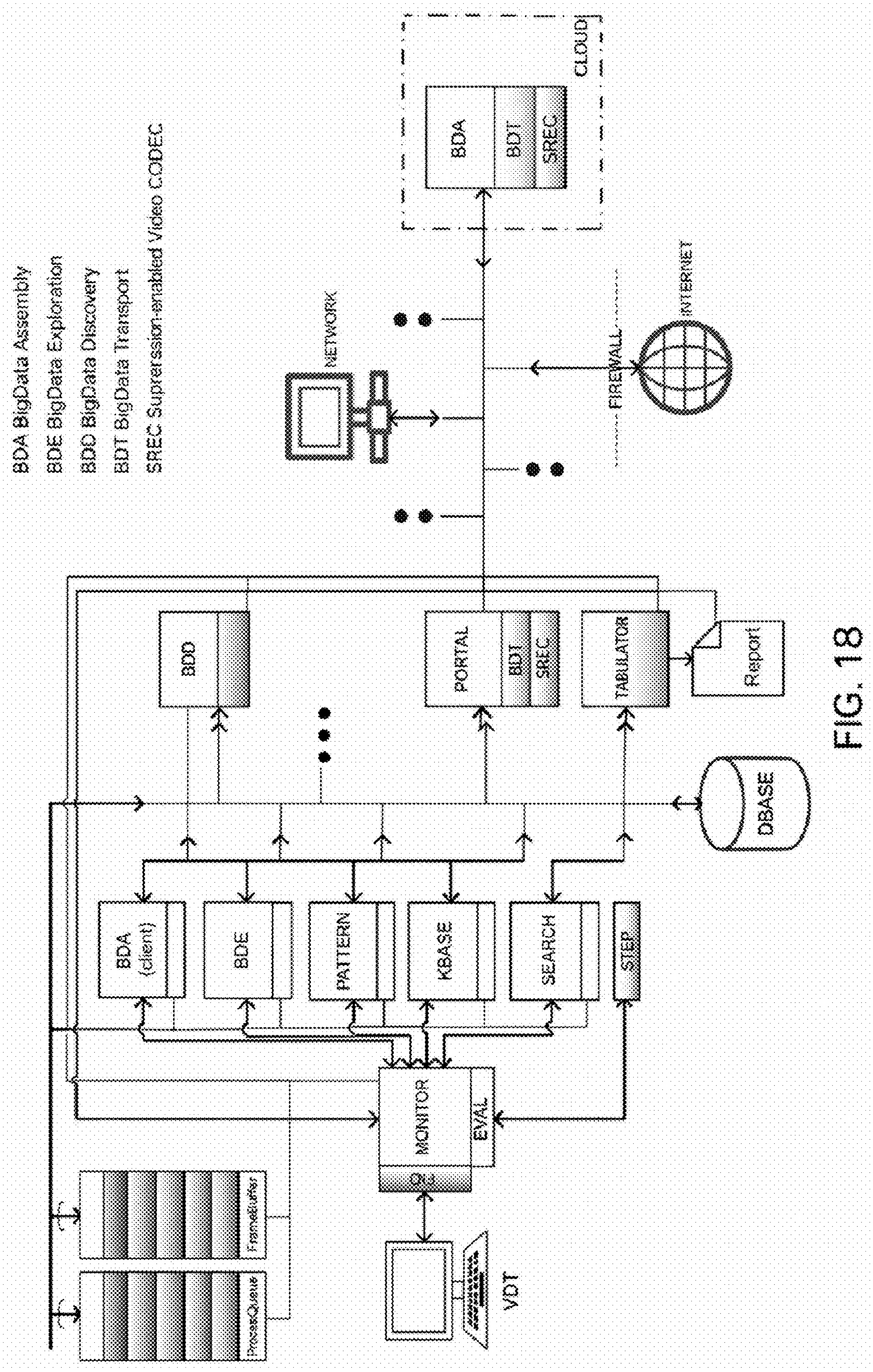
FIG. 18 shows a cloud-distributed BigData AI architecture.

A simplified architectural form by which all component processes may be invoked is displayed in the Cloud-Distributed BigData AI Architecture of FIG. 18. A BDD-initiated invocation of BDA and BDE AI is implemented via a top-level supervisory process that is also AI. In this manner, the problem of BigData DATAVERSE processing further devolves to knowledge-based application of BDA, BDE, and BDD. Accordingly, a solution-state trajectory comprises EAG node-visitations. In this particular architectural variant, a superresolution-enabled video compression (SREC) based network video transport (BDT) is combined with a cloud-based BDA implementation.

Moving back to FIG. 15 for a moment, SREC implementation is further simplified and unified with use of VPC as an architectural building-block. It should be noted the resulting hierarchical AI architectural-form is representative of an entire class of cutting-edge innovations, most generally for AI technology and specifically for exascale processing on BigData DATAVERSE.

DISCLAIMER

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An iterative process for performing Multi-Frame Video Analysis (MFVA) on a video sequence, comprising:

storing the video sequence into a video buffer, the video sequence comprising a plurality of individual video frames;

extracting position data for one or more objects of interest within a particular frame of the video sequence;

forming a SpatioTemporal Plane (STP) associated with the particular frame;

applying one or more Kalman filter denoise mechanisms to the STP;

calculating an optical flow boundary for the one or more objects of interest within the particular frame;

applying a Neural Network classifier to the one or more optical flow boundaries suitable for calculation of possible z-axis motion within the particular frame;

calculating a SpatioTemporal Volume (STV) of the particular frame, thereby bringing the video sequence into a 3D computational modality;

calculating a dynamical state for the one or more objects of interest within the STV of the particular frame;

extracting dynamical attributes from the STV of the particular frame;

finishing processing of the particular frame and either displaying or storing that frame;

checking the video buffer for more frames; and if more frames exist within the video buffer, re-start the video sequence with the next frame, if no more frames exist within the video buffer, cease processing and cease displaying any video.

2. The method of claim 1, further comprising:

updating a video analytics logical state based upon logical combination of predetermined elements within the video stream.

3. The method of claim 2, further comprising:

one of the predetermined elements within the video stream being object attributes.

4. The method of claim 3, further comprising:

one of the predetermined elements within the video stream being the dynamical state.

5. The method of claim 4, further comprising:
one or more of the predetermined elements within the video stream being pertinent advisories.

6. The method of claim 5, further comprising:
the one or more pertinent advisories being AI-generated.

7. The method of claim 6, further comprising:
casting dynamical variables as functions on a trajectory and storing them within an STV tensor field; and
extracting the dynamical variables from the STV-tensor field thereby providing dynamical support during processing of the video stream.

8. The method of claim 6, further comprising:
enhancing understanding of the particular frame by using a Large Language Model (LLM).

9. The method of claim 8, further comprising:
categorizing inanimate objects manifesting one or more dynamical interactions in terms of a stateful energy exchange.

10. The method of claim 9, the stateful energy exchange further comprising one or more of an elastic/inelastic collision with characteristic energy, momentum, or mass transfer.

11. The method of claim 8, further comprising:
describing interactions involving animate objects in terms of logical-only with no apparent mass-energy transfer.

* * * * *